United States Patent [19]
Miyazaki

[11] Patent Number: 6,095,444
[45] Date of Patent: Aug. 1, 2000

[54] ATTACHMENT UNIT FOR A DOUBLE BEARING TYPE REEL FOR FISHING

[75] Inventor: Takeo Miyazaki, Tokyo, Japan

[73] Assignee: Daiwa Seiko, Inc., Tokyo, Japan

[21] Appl. No.: 08/922,481

[22] Filed: Sep. 3, 1997

[30] Foreign Application Priority Data

| Sep. 3, 1996 | [JP] | Japan | 8-252345 |
| Sep. 3, 1996 | [JP] | Japan | 8-252346 |
| Sep. 25, 1996 | [JP] | Japan | 8-010431 |
| Sep. 27, 1996 | [JP] | Japan | 8-277422 |

[51] Int. Cl.⁷ .................................................. A01K 89/015
[52] U.S. Cl. ........................... 242/312; 242/310; 242/314
[58] Field of Search .................................... 242/310, 311, 242/312, 319, 321, 314, 315; D22/140, 141

[56] References Cited

U.S. PATENT DOCUMENTS

| 5,127,603 | 7/1992 | Morimoto | 242/310 X |
| 5,636,804 | 6/1997 | Jeung | 242/310 X |
| 5,690,288 | 11/1997 | Yamaguchi | 242/310 X |
| 5,743,479 | 4/1998 | Miyazaki et al. | 242/310 X |

FOREIGN PATENT DOCUMENTS

| 5-53474 | 7/1920 | Japan . |
| 61-18682 | 6/1986 | Japan . |
| 62-204477 | 12/1987 | Japan . |
| 63-107174 | 7/1988 | Japan . |
| 4-41265 | 4/1992 | Japan . |
| 5-60271 | 8/1993 | Japan . |
| 6-29027 | 8/1994 | Japan . |

*Primary Examiner*—Donald P. Walsh
*Assistant Examiner*—William A. Rivera
*Attorney, Agent, or Firm*—Liniak, Berenato, Longacre & White

[57] ABSTRACT

In a double bearing type reel, an attaching member to be attached onto the inside or outside of a side plate is fastened by one screw from the inside of a bearing, to thereby enhance the work efficiency and beauty.

3 Claims, 23 Drawing Sheets

ATTACHMENT UNIT FOR A DOUBLE BEARING TYPE REEL FOR FISHING

BACKGROUND OF THE INVENTION

The present invention relates to improvements in a double bearing type reel for fishing in which a fishing line is wound round a spool rotatably supported between side plates of a reel body.

Concerning a conventional double bearing type reel for fishing in which a fishing line is wound round a spool rotatably supported between side plates of a reel body, for example, as disclosed in Japanese Unexamined Utility Model Publication No. 5-60271, one of the side plates is detachably fixed to a frame, and a bearing member to rotatably support the spool is fixed to the side plate with a plurality of screws.

Also, as disclosed in Japanese Unexamined Utility Model Publication Nos. 62-204477 and 4-41265, a bearing member is fixed to the side plate from the outside or the inside with a plurality of screws.

Since the bearing member and the cover are fixed to the side plates with the plurality of screws as described above, the work efficiency is low, and the cost is raised. Since the screws are exposed outside, when the reel for fishing is used in a severe environment in which sea water or fresh water tends to adhere to the reel, the screws tend to corrode and the beauty of the reel is spoilt.

In a conventional double bearing type reel body for fishing, material and thickness of the members to compose the reel are determined in accordance with the use of the reel. When a reel is used for fishing to catch fish of a large size, these members are made of metal. When a reel is used for fishing to catch fish of an intermediate or small size, these members are made of resin so that the cost and the weight can be reduced.

When resin is used for the material of members to compose the reel, the weight of the reel can be reduced and the operation property can be enhanced, however, mechanical strength of the members made of resin is not sufficiently high. Especially, mechanical strength of the side plates to support the drive member is not sufficiently high, and dimensions of the side plates can not be maintained sufficiently high when a heavy load is applied to the reel.

Concerning the surface treatment, coating is conducted on the reel, however, when the reel is coated with coating material, the reel can not look high-class.

When the members to compose the reel are made of aluminum, the treatment of alumite is generally conducted on the surfaces of the members. However, in the case of material of high mechanical strength, it is impossible to provide a good appearance of alumite. Therefore, the members are subjected to coating. Accordingly, the same problems as those described above are caused on the appearance of coated surfaces.

In order to enhance the mechanical strength of both materials of resin and aluminum, the thickness of a portion, the mechanical strength of which must be high, is increased so that the portion can be reinforced. However, when the thickness is partially increased, the problems of shrinkage and weld are caused in the process of molding, and further the thickness which has been partially increased restricts designing when the reel is designed compact.

Concerning a handle shaft of the conventional double bearing type reel, at one end of which a handle is attached to drive a spool rotatably supported between the side plates of a reel body, for example, as disclosed in Japanese Examined Utility Model Publication No. 6-29027 and Japanese Unexamined Utility Model Publication No. 5-53474, the handle shaft is rotatably supported by one of the side plates of the reel while the handle shaft is prevented from coming off in the axial direction.

According to the structure disclosed in the above utility model publication, the handle shaft is prevented from coming off in such a manner that an end surface of the base portion of the handle shaft is capable of coming into contact with a sheet-shaped metallic washer on the inside plate of the reel body. Due to the above structure, an intense play is caused in the axial direction of the handle shaft by the dimensional tolerance of parts and the fluctuation of dimensions. Therefore, the drive gear mounted on the handle shaft can not be stably meshed with the pinion. As a result, the rotational performance becomes unstable, and further the durability of the drive mechanism is deteriorated.

The conventional fishing reel is further disclosed in Japanese Unexamined Utility Model Publication No. 63-107174 and Japanese Examined Utility Model Publication No. 61-18682.

By a braking device, a braking force is given to a spool which is rotatably supported between the side plates of a reel for fishing, and an operation adjustment knob to adjust the braking force is mounted on a handle shaft. In the operation adjustment knob, there are provided a plurality of arms which are extending in the radial direction at regular intervals.

In this connection, when a braking force is adjusted in this braking device, the adjustment knob is turned or reversed by a thumb or forefinger of a fisherman so that the adjustment knob can be fastened or unfastened. In this way, an intensity of the braking force given to the spool is adjusted in accordance with the -circumstances of fishing.

Since the thickness of the arm of the operation adjustment knob is uniform, that is, the dimension of the arm of the operation adjustment knob in the axial direction of the handle shaft is uniform, a fisherman feels a pain when he operates the knob with his finger. Therefore, it is impossible for him to enjoy fishing comfortably. In this type arm, there is provided an expanding section in the circumferential direction of the arm. Accordingly, when the fisherman conducts a rotational operation, his finger is caught by the expanding section of the arm, and it is impossible for him to conduct a rotational operation smoothly and quickly.

SUMMARY OF THE INVENTION

In consideration of the various problems found in the conventional double bearing type reels for fishing, the present invention was made. An object of the present invention is to provide a double bearing type reel for fishing characterized in that: attaching members to be attached to the inside and outside of the side plate of the reel are fastened from the inside of the bearing with one screw so as to enhance the work efficiency and the beauty of appearance.

To achieve the object, the present invention provides a double bearing type reel for fishing in which a fishing line is wound round a spool rotatably supported between side plates of a reel body, characterized in that: attaching members such as a bearing support member and a cover to be detachably attached to the inside and outside of the side plate are fastened to the side plate of the reel body by one screw from the inside of a bearing mounted on a spool shaft to support the spool.

It is another object of the present invention to provide a double bearing type reel for fishing in which a substantially annular cover is attached onto the outside surrounding the drive support section so as to increase the mechanical strength and enhance the appearance.

To achieve the object, the present invention provides a double bearing type reel for fishing in which a fishing line is wound round a spool rotatably supported between side plates of a reel body, characterized in that: a substantially annular cover is attached and fixed onto the outside of the side plate surrounding a drive support section of the spool.

Yet another object of the present invention is to provide a double bearing type reel for fishing characterized in that: play of a handle shaft caused in the axial direction is absorbed, so that the movement of the handle shaft in the axial direction is stably restricted to maintain a high rotational performance.

To achieve the object the present invention provides a double bearing type reel for fishing in which a spool rotatably supported between side plates of a reel body can wind a fishing line by a handle shaft, to one end of which a handle is attached, supported by one of the side plates, via a drive mechanism, characterized in that: a base portion of the handle shaft is rotatably supported by a bearing attached onto an inside plate of the side plate of the reel and prevented from coming off; and a deformable absorbing member is provided between an end surface of the base portion of the handle shaft and the inside plate so as to absorb play caused in the axial direction.

Still another object of the present invention to provide a braking force adjustment device of a reel for fishing characterized in that: no pain is felt in a finger of a fisherman in the case of a rotational operation; and it is possible to conduct a rotational operation smoothly even when the handle is held.

To achieve the object, the present invention provides a braking force adjustment device of a reel for fishing comprising: side plates forming a reel body; a spool rotatably supported between the side plates; a drive gear for driving the spool so as to wind a fishing line; a handle shaft attached to the side plates, rotatably supporting the drive gear; a braking plate to be engaged with the drive gear; an operation adjustment knob screwed to the handle shaft so that it can be freely moved on the handle shaft, the operation adjustment knob pushing the braking plate so as to combine the drive gear with the handle shaft by friction; and a plurality of arms extending in the radial direction from the base of the operation adjustment knob, wherein a shape of each arm on a surface parallel with the side plate is tapered from the base to the end, and thickness of the arm in the axial direction of the handle shaft is large at least in the end portion. Thickness of the arm in the axial direction of the handle shaft is gradually increased from the base to the end of the arm.

DETAILED DESCRIPTION OF THE PREFERRED EMBODIMENTS

Figure 1:
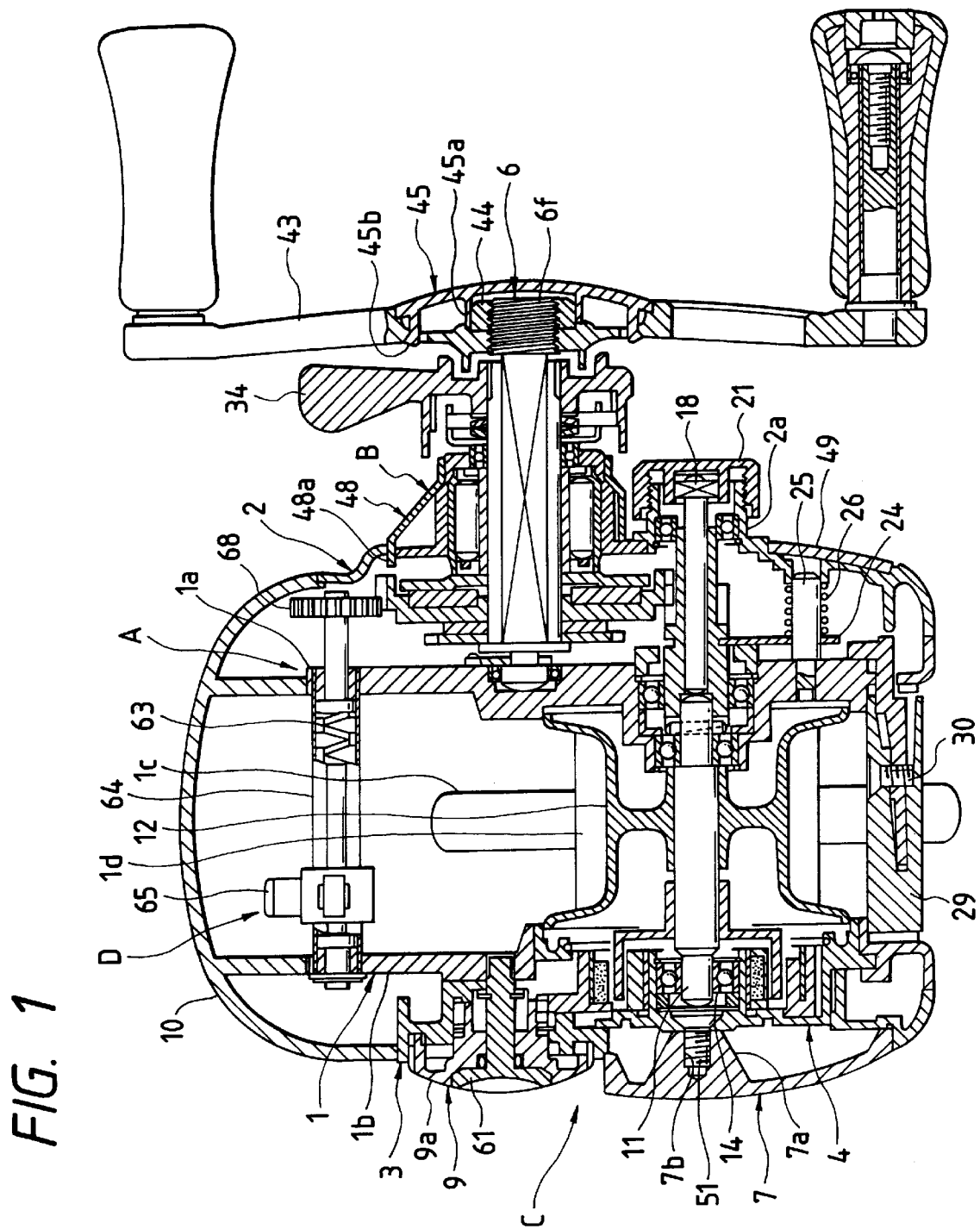
FIG. 1 is a cross-sectional plan view of the double bearing type reel for fishing of the first example.
Figure 2:
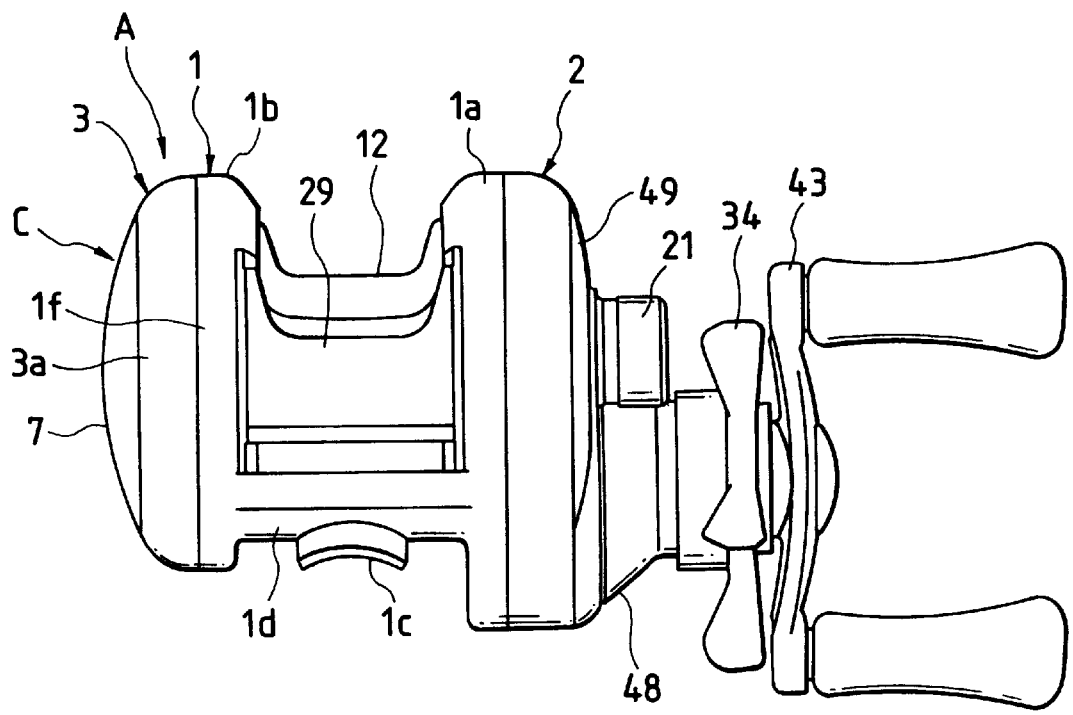
FIG. 2 is a rear view of the double bearing type reel for fishing of the first example.
Figure 3:
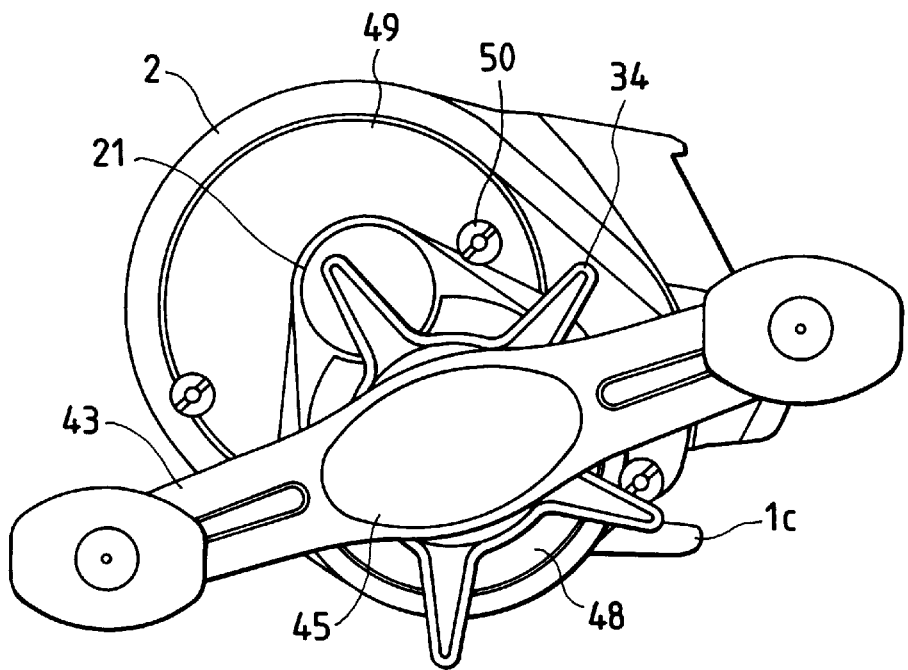
FIG. 3 is a side view of the double bearing type reel for fishing on the handle side of the first example.
Figure 4:
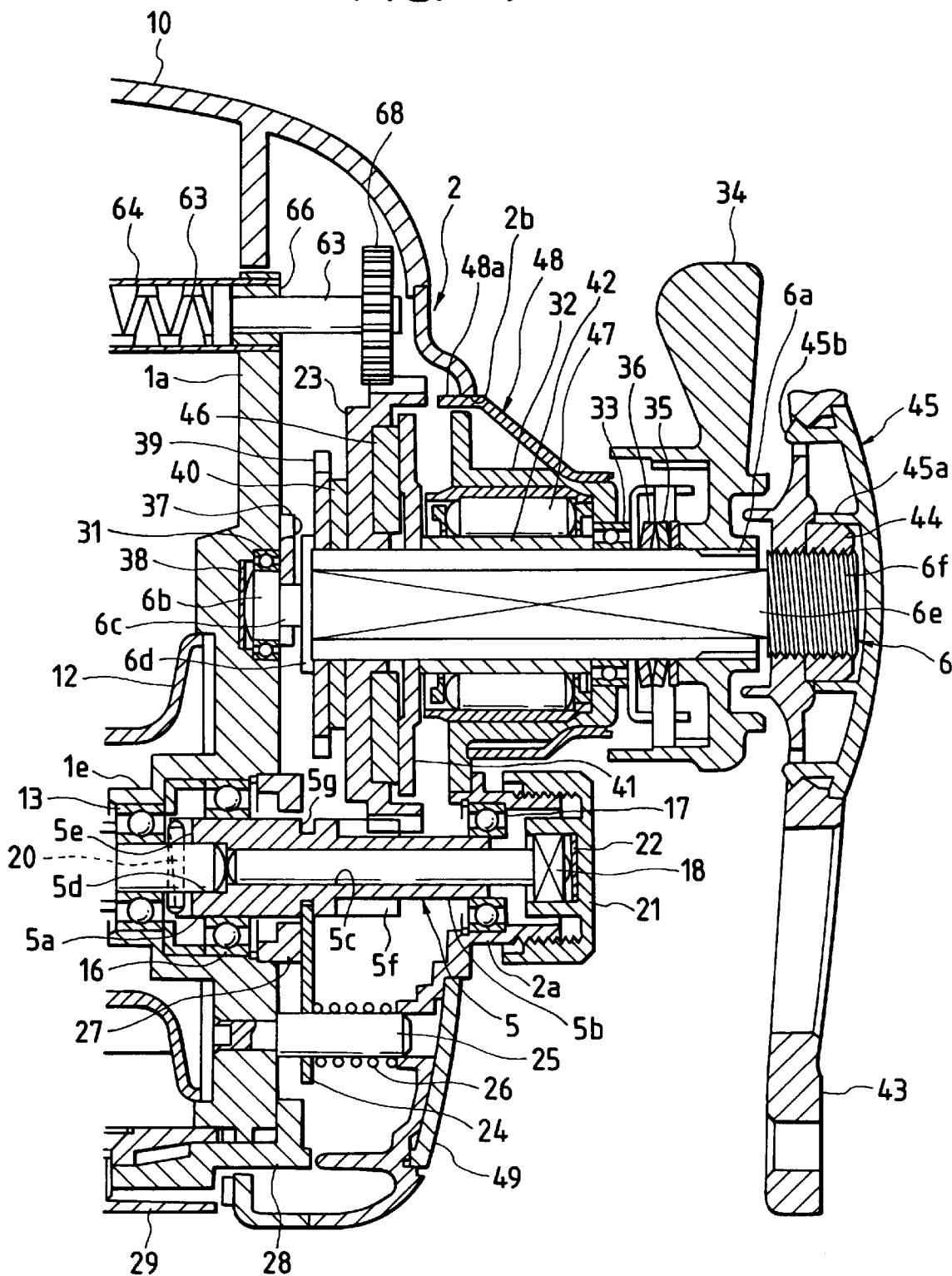
FIG. 4 is an enlarged cross-sectional plan view of the double bearing type reel for fishing on the handle side of the first example.
Figure 5:
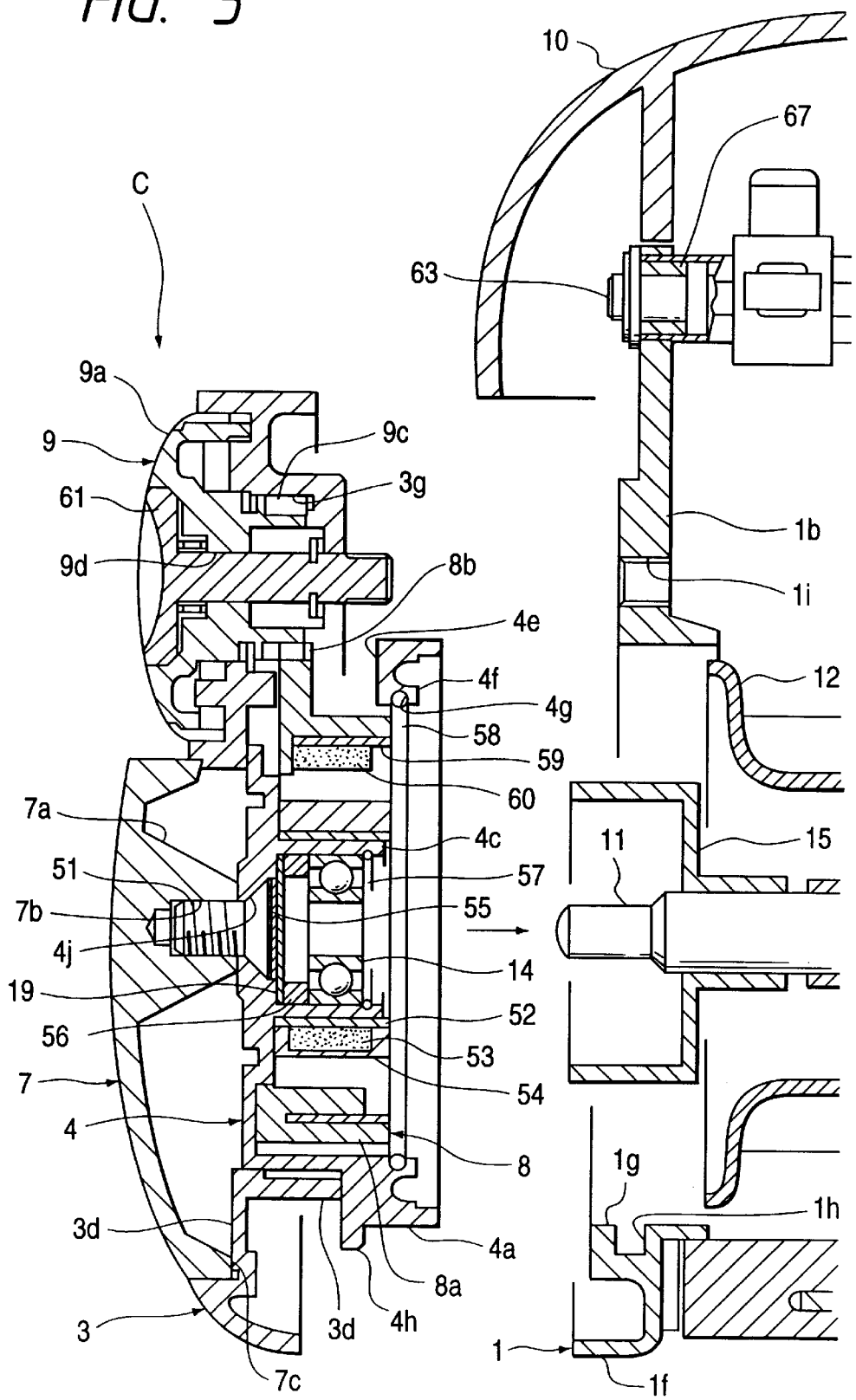
FIG. 5 is an enlarged exploded cross-sectional plan view of the double bearing type reel for fishing of the first example on the side opposite to the handle side.
Figure 6:
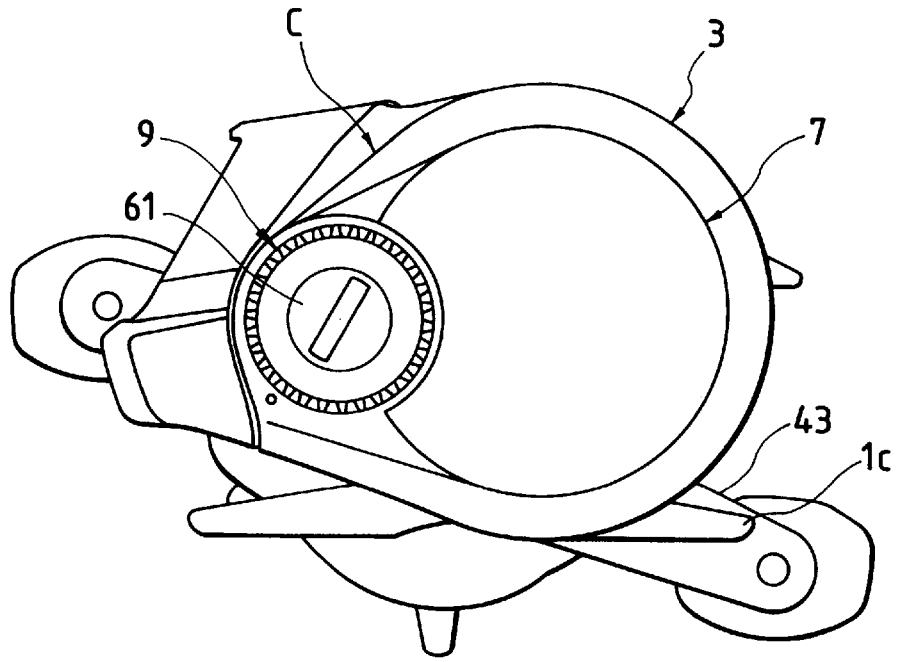
FIG. 6 is a side view of the double bearing type reel for fishing on the side opposite to the handle side of the first example.
Figure 7:
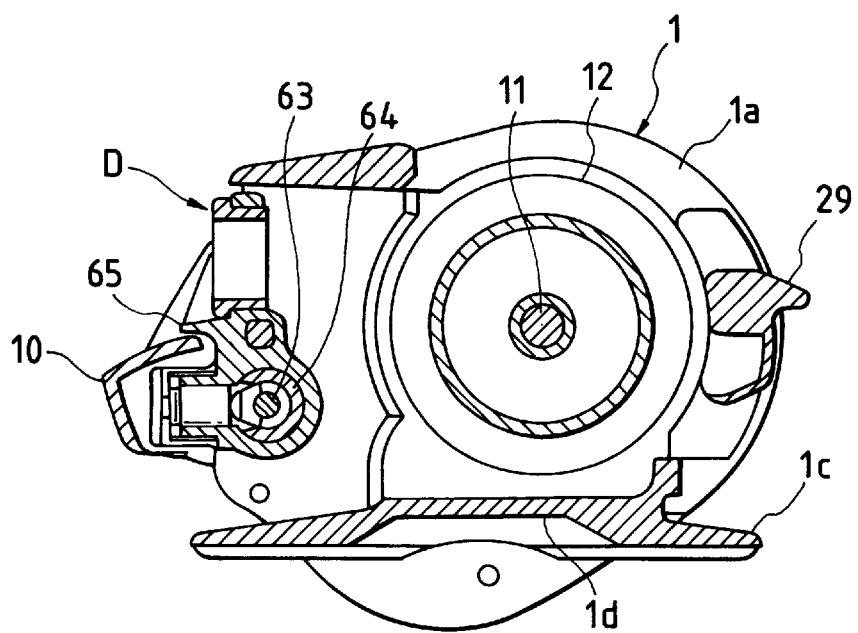
FIG. 7 is a cross-sectional side view of the double bearing type reel for fishing on the inside of the side frame of the first example.
Figure 8:
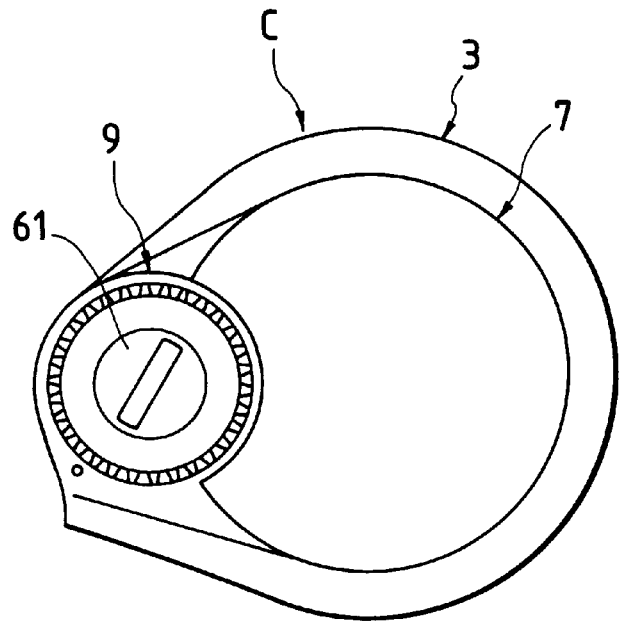
FIG. 8 is a side view of the double bearing type reel for fishing on the outside of the attaching unit of the first example.
Figure 9:
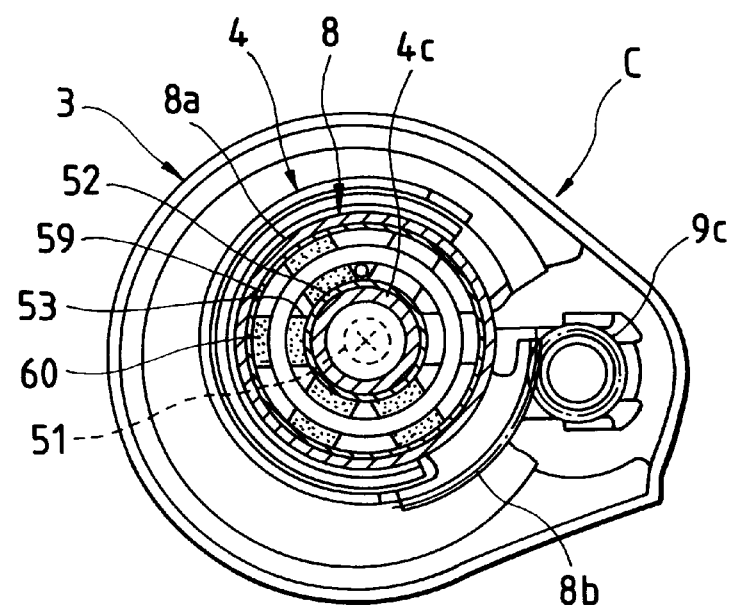
FIG. 9 is a cross-sectional side view of the primary portion of the double bearing type reel for fishing on the inside of the attaching unit of the first example.
Figure 10:
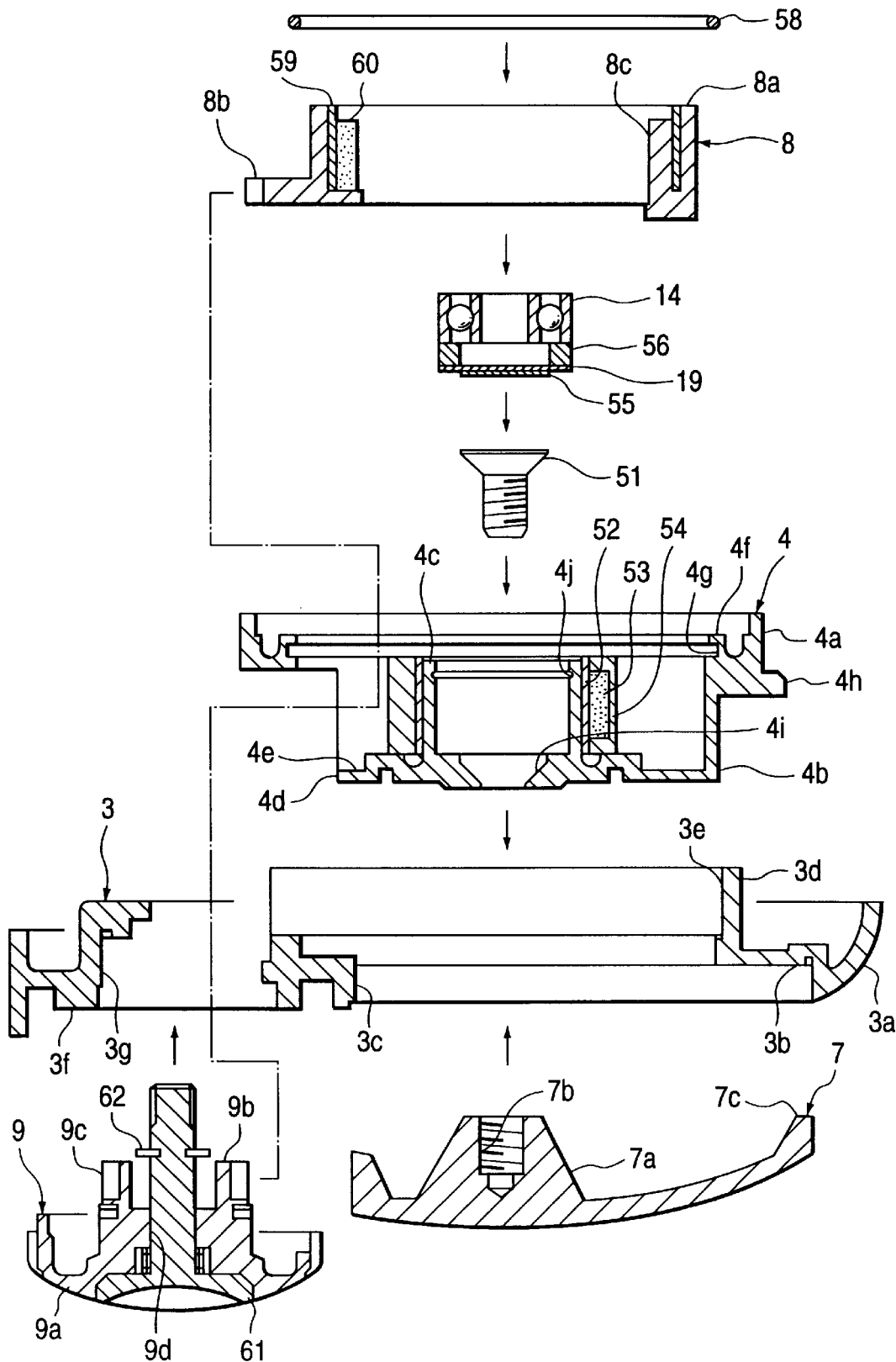
FIG. 10 is an exploded cross-sectional plan view of the attaching unit of the double bearing type reel for fishing of the first example.
Figure 11:
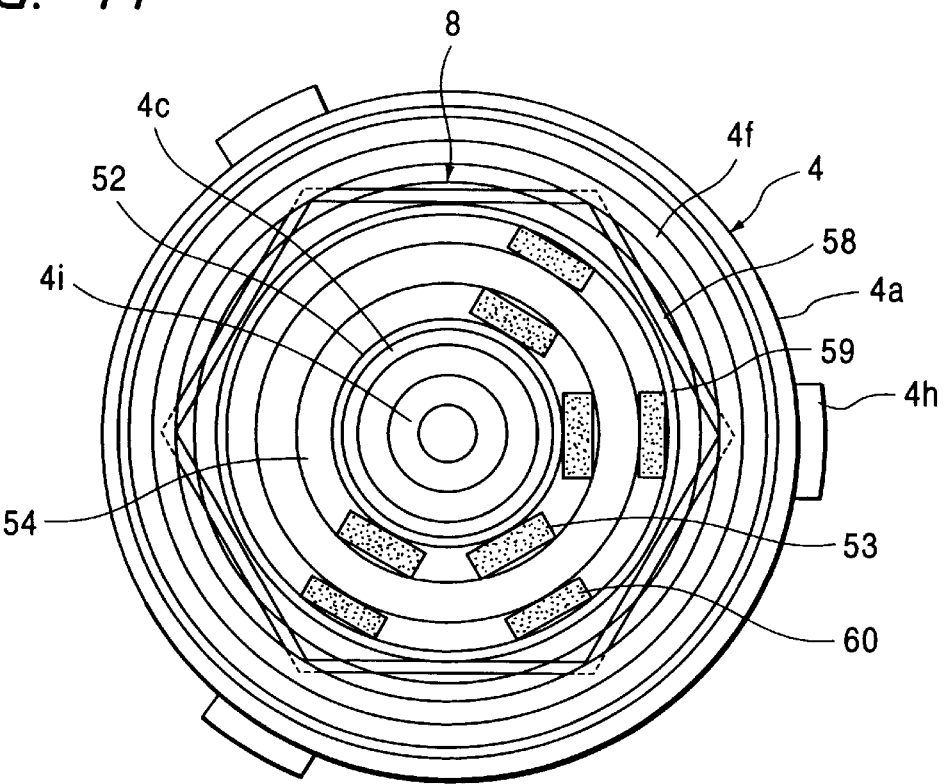
FIG. 11 is a side view of the inside of the bearing support member of the double bearing type reel for fishing of the first example.
Figure 12:
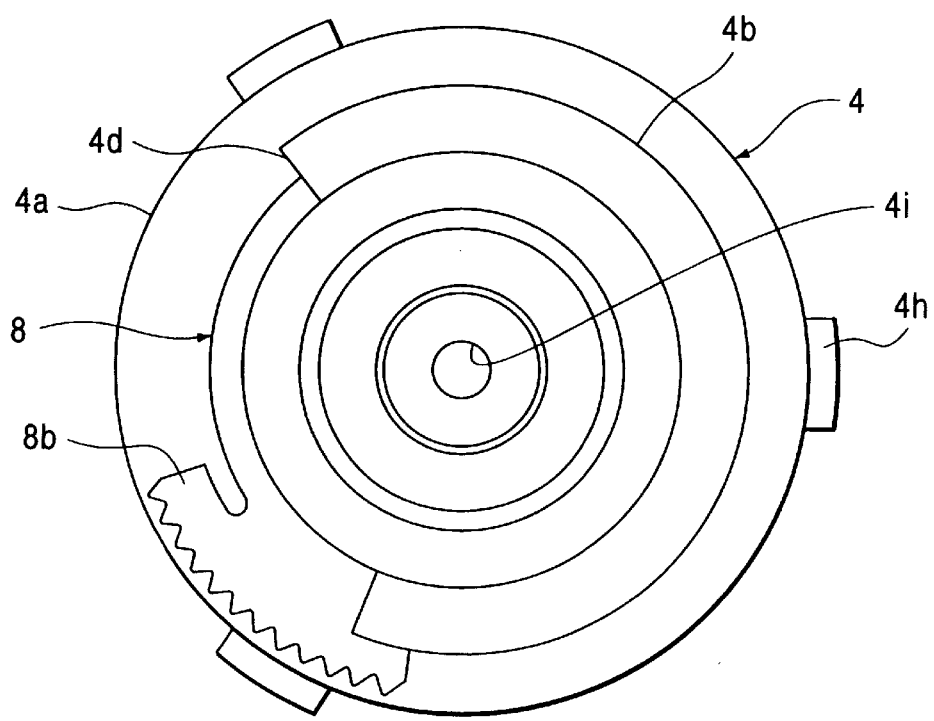
FIG. 12 is a bottom view of the bearing support member of the double bearing type reel for fishing of the first example.

Referring to an example shown in the accompanying drawings, the present invention will be explained below. FIGS. 1 to 12 show the first example of the present invention. FIG. 1 is a cross-sectional plan view of the double bearing type reel for fishing. FIG. 2 is a rear view of the double bearing type reel for fishing. FIG. 3 is a side view of the double bearing type reel for fishing on the handle side. FIG. 4 is an enlarged cross-sectional plan view of the double bearing type reel for fishing on the handle side. FIG. 5 is an enlarged exploded cross-sectional plan view of the double bearing type reel for fishing on the side opposite to the handle side. FIG. 6 is a side view of the double bearing type reel for fishing on the side opposite to the handle side. FIG. 7 is a cross-sectional side view of the double bearing type reel for fishing on the inside of the side frame. FIG. 8 is a side view of the double bearing type reel for fishing on the outside of the attaching unit. FIG. 9 is a cross-sectional side view of the primary portion of the double bearing type reel for fishing on the inside of the attaching unit. FIG. 10 is an exploded cross-sectional plan view of the attaching unit of the double bearing type reel for fishing. FIG. 11 is a side view of the inside of the bearing support member of the double bearing type reel for fishing. FIG. 12 is a bottom view of the bearing support member of the double bearing type reel for fishing.

Reel body A includes: a frame body 1; a right side plate 2 attached to a side frame 1a of the frame body 1; and a left side plate 3 attached to a side frame 1b of the frame body 1, wherein a front cover 10 is attached to the front side.

The frame 1 includes: both side frames 1a, 1b; a support not shown in the drawing; and a fixing plate 1d for fixing a reel leg 1c, wherein these members are integrated into one unit, and both side frames 1a, 1b are held in parallel with each other.

Between both side frames 1a and 1b, there is provided a spool 12 fixed to a spool shaft 11 so that the spool 12 can be rotated. The spool shaft 11 is rotatably supported by one bearing 13 provided in a shaft cylinder 1e on the right frame 1a side, and the other bearing 14 provided in an attaching member 4 made up of a bearing support member provided on the left frame 1b side.

A magnetic brake cylinder 15 is fixed on the outer circumference of the spool shaft 11 on the bearing 14 side.

A shaft cylinder 5a of large diameter of the pinion 5 is rotatably supported by another bearing 16 attached in the shaft cylinder 1e on the right frame 1a side, wherein the shaft cylinder 5a can be moved in the axial direction. A shaft cylinder 5b of small diameter of the pinion 5 is rotatably supported by a bearing 17 attached in the shaft cylinder 2e on the right side plate 2 side, wherein the shaft cylinder 5b can be moved in the axial direction.

A pushing shaft rod 18 is movably engaged in a central hole 5c of the pinion 5 while the pushing shaft rod 18 can be moved in the axial direction.

On both sides of the spool shaft 11, there are provided small diameter portions to be respectively supported by the bearings 13, 14, and a small diameter portion of the bearing 14 comes into contact with a thrust bearing 19.

An engaging protrusion 20 of a pin forming a clutch mechanism is fixed to the small diameter portion protruding to the right from the bearing 13. This small diameter portion is inserted into a large diameter hole 5d of the pinion 5 and comes into contact with one side of the pushing shaft rod 18.

On one end surface of the shaft cylinder 5a of large diameter of the pinion 5, there is provided an engaging groove 5e forming the clutch mechanism, wherein the engaging groove 5e is formed in a direction perpendicular to the axis. The engaging protrusion 20 is detachably inserted into the engaging groove 5e.

On the outer circumference of the shaft cylinder 2a on the right side plate 2, there is provided a screw portion. A pushing knob 21 is screwed into the screw portion. In the pushing knob 21, there is formed an elliptical recess used for locking. In this elliptical recess used for locking, a locking portion on the other side of the pushing shaft rod 18 is engaged, and at the same time, the end on the other side of the pushing shaft rod 18 comes into contact with a thrust bearing 22 arranged in the pushing knob 21.

There are provided pinion teeth 5f and a circumferential groove 5g on the outer circumference of the shaft cylinder 5a of large diameter of the pinion 5. A drive gear 23 mounted on the drive shaft 6 is meshed with the pinion teeth 5f.

An operation plate 24 forming the clutch mechanism is engaged with the circumferential groove 5g.

On the outside of the right frame 1a, there is provided a support 25, which is inserted into the operation plate 24 and the spring 26. The operation plate 24 is pushed by the spring 26 so that the engaging protrusion 20 of the spool shaft 11 can be engaged in the engaging groove 5e of the pinion 5.

There is rotatably provided a clutch operation ring 27 at the hole edge of the right frame 1a on the outside of the shaft cylinder 5a of large diameter of the pinion 5. This clutch operation ring 27 comes into contact with the operation plate 24. A clutch operation lever 28 is connected to this clutch operation ring 27.

Between both frame portions 1a and 1b arranged at the rear of the frame 1, there is provided a finger setting section 29 capable of moving in the vertical direction. One end of the clutch operation lever 28 is fixed to the finger setting section 29 by a screw 30.

The clutch operation ring 27 is provided with a cam (not shown) by which the operation plate 24 is operated.

The drive shaft 6 is supported by a bearing 31 provided in the right frame 1a and a bearing 33 supported by the drive support section 32 attached to the right side plate 2, wherein the drive support section 32 can be freely moved in the axial direction. There is provided a drag adjustment knob 34 which is screwed to the screw section 6a of the drive shaft 6 on the right outside of the bearing 33.

A cylindrical section of the drag adjustment knob 34 comes into contact with the bearing 33 via spring plates 35, 36.

The drive shaft 6 includes: a large diameter section 6b engaged with the bearing 31, small diameter section 6c, flange section 6d, elliptical locking section 6e, and screw section 6f.

The bearing 31 is inserted into a recess of the right frame section 1a and prevented from coming off by a fixing plate 37.

One end of the large diameter section 6b comes into contact with a thrust bearing 38.

On the outer circumference of the locking section 6e, there are provided a claw wheel 39, friction plate 40, drive gear 23, pushing plate 41, and collar 42. In this arrangement, the claw wheel 39, pushing plate 41 and collar 42 are engaged with the drive shaft 6 so that they can not be rotated round the drive shaft 6.

A handle 43 and nut 44 are screwed to the screw section 6f.

Rotation of the nut 44 is checked by the locking section 45a of a nut cover 45. The engaging section 45b of the nut cover 45 is inserted into and engaged with the engaging hole of a handle 43.

A drag brake mechanism is composed in such a manner that a friction member 46 is interposed between the drive gear 23 and the pushing plate 41.

On the outer circumference of the collar 42, there are provided a plurality of rod-shaped rolling members 47 of a rolling type one way clutch B.

The rolling type one way clutch B is supported by the drive support section 32.

By the action of the rolling type one way clutch B, it is possible to rotate the handle 43 in a rational direction in which a fishing line (not shown) is wound round the spool 12, and it is impossible to rotate the handle 43 in the reverse direction.

A substantially annular cover 48 is engaged on the outer circumference of the end portion of the drive support section 32 on the drag adjustment knob 34 side. An engaging section 48a of the cover 48 is inserted into and calked with the engaging hole 2b on the right side plate 2.

The drive support section 32, the outer circumference of which is protruded at the position of the rod-shaped rolling member 47, is covered with the cover 48 and reinforced by the right side plate 2.

As illustrated in FIG. 3, a cover 49 is fixed onto the surface of the right side plate 2 outside the shaft cylinder 2a to which the pushing knob 21 is screwed, by means of calking. The right side plate 2 is attached to the right frame section 1a by a screw 50.

In the same manner as that of the nut cover 45, the cover 49 may be attached to the right side plate 2 by the engaging section.

As illustrated in FIGS. 1, 5, 6, 8, 9 and 10, the attaching unit C includes: the left side plate 3, attaching member 4 made up of the bearing support section member, attaching member 7 made up of the cover, magnetic brake member 8, and brake adjustment knob 9.

The left side plate 3 is interposed between the attaching member 4 made up of the bearing support member and the attaching member 7 made up of the cover, wherein the attaching member 4 and the attaching member 7 are fastened by one screw 51.

As illustrated in FIGS. 2 and 5, in the left frame 1b, there are provided an outer circumferential section 1f extending onto the left side plate 3 and a through-hole 1g of large diameter, and there are provided a plurality of engaging recesses 1h at the opening edge of the through-hole 1g of large diameter.

There is provided a screw hole 1i outside the through-hole 1g of large diameter of the left frame 1b.

As illustrated in FIGS. 1, 2, 5 and 10, the left side plate 3 includes: an outer circumferential section 3a, engaging section 3b on the end surface of the outer circumferential section 3a, inner circumferential section 3c on the end surface side, cylindrical section 3d on the inner side, inner circumferential section 3e in the cylindrical section 3d, cylindrical section 3f, and inner circumferential section 3g of the cylindrical section 3f.

As illustrated in FIGS. 1, 5, 6, 8, 9, 10, 11 and 12, the attaching member 4 made up of the bearing support member includes: a large diameter section 4a, and a bearing support cylinder 4c arranged inside which is formed into a C-shape in the large diameter 4a and the intermediate diameter section 4b.

Outside the intermediate diameter section 4b, there is provided an opening 4e which is formed by a cutout 4d.

Inside the large diameter section 4a, there is provided an annular bank-shaped portion 4f. Inside the annular bank-shaped portion 4f, there is provided an engaging groove 4g.

On the rear side of the outer circumference of the large diameter section 4a, there are provided a plurality of engaging protrusions 4h.

On the bottom surface of the bearing support cylinder 4c, there is provided a conic through-hole 4i. At the opening edge of the bearing support cylinder 4c, there is provided an engaging groove 4j.

A ring 52 made of magnetic material is fixed onto the outer circumference of the bearing support cylinder 4c.

A cylindrical body 54 into which a plurality of magnets 53 are inserted is engaged with and fixed to the outer circumference of the ring 52.

The ring 52 made of magnetic material and the magnets 53 may be inserted into the attaching member 4 made up of the bearing support member.

In the bearing support cylinder 4c, there are provided a screw 51, spacer 55, thrust bearing 19, spacer 56 and bearing 14, which are prevented from coming off from the bearing support cylinder 4c by an engaging ring 57.

The magnetic brake member 8 is inserted into the intermediate diameter section 4b and prevented from coming off by an engaging ring 58 engaged in the engaging groove 4g.

The attaching member 7 made up of the cover is formed into a curved shape. Inside the attaching member 7, there is provided a protruding section 7a. In the protruding section 7a, there is provided a screw hole 7b. In the periphery of the attaching member 7, there is provided an annular engaging section 7c.

As illustrated in FIGS. 1, 5, 9, 10, 11 and 12, the magnetic brake member 8 includes: a cylindrical section 8a, tooth section 8b protruding from the outer circumference of the cylindrical section 8a, and inner circumferential section 8c in the cylindrical section 8a. In this structure, the ring 59 made of magnetic material and the plurality of magnets 60 are subjected to insert formation.

There is provided a brake adjustment knob 9, which includes an operating section 9a arranged on the outer circumference, shaft cylinder section 9b, tooth section 9c arranged on the outer circumference of the shaft cylinder section 9b, and central through-hole 9d.

A screw 61 having a head portion is inserted into the central through-hole 9d and prevented from coming off by an E ring 62.

Between both side frames 1a and 1b in the front section of the frame 1, there is provided a level winding device D.

Level winding device D includes: a traverse shaft 63, guide cylinder 64, and fishing line guide body 65 sliding on the outer circumference of the guide cylinder 64 in the transverse direction.

The traverse shaft 63 is supported by the right 66 and the left bearing 67 arranged in the guide cylinder 64.

A gear 68 is attached to one end of the traverse shaft 63. This gear 68 is meshed with a drive gear 23.

When the attaching unit C is assembled, the attaching member 4 made up of the bearing support member is set inside the left side plate 3, and the attaching member 7 made up of the cover is set outside, and then both attaching members are fastened to each other by a screw 51 which is screwed into a screw hole 7b.

Next, the magnetic brake member 8 is inserted into the attaching member 4 made up of the bearing support member and prevented from coming off by an engaging ring 58.

Into the bearing support cylinder 4c, there are inserted a screw 51, spacer 55, thrust bearing 19, spacer 56 and bearing 14, which are prevented from coming off by an engaging ring 57.

The brake adjustment knob 9 is inserted into the inner circumferential section 3g, and the tooth section 8b is meshed with the tooth section 9c.

When the attaching unit C is attached to the frame 1, the attaching member 4 made up of the bearing support member is inserted into the through-hole 1g of large diameter in the left frame 1b and rotated. Therefore, the plurality of engaging protrusions 4h are engaged with the plurality of engaging recesses 1h, and the screw 61 inserted into the central through-hole 9d of the brake adjustment knob 9 is screwed into the screw hole 1i.

When the attaching unit C is attached to the frame 1, the spool shaft 11 is inserted into the bearing 14, and the magnetic brake cylinder 15 is arranged between the magnets 53 and 60.

In the above arrangement, the attaching member 4 made up of the bearing support member is provided with a plurality of engaging protrusions 4h, which are engaged with the plurality of engaging recesses 1h. However, it is possible to provide a plurality of engaging protrusions on the left side plate 3, and the plurality of engaging protrusions may be engaged with the plurality of engaging recesses 1h.

Due to the above arrangement of the double bearing type reel for fishing, the attaching member 4 made up of the bearing support member attached inside the left side plate 3, and the attaching member 7 made up of the cover attached outside the left side plate 3 are fastened to each other by one screw 51 from the inside of the bearing 14 mounted on the spool shaft 11 for supporting the spool 12. That is, the attaching members 4 and 7 are fixed to each other at one position. Due to the foregoing arrangement, it is possible to prevent the members from inclining, so that the assembling accuracy can be enhanced. Since the fastening work is conducted at one position, the work efficiency can be enhanced, and further the beauty of the reel can be improved.

Figure 13:
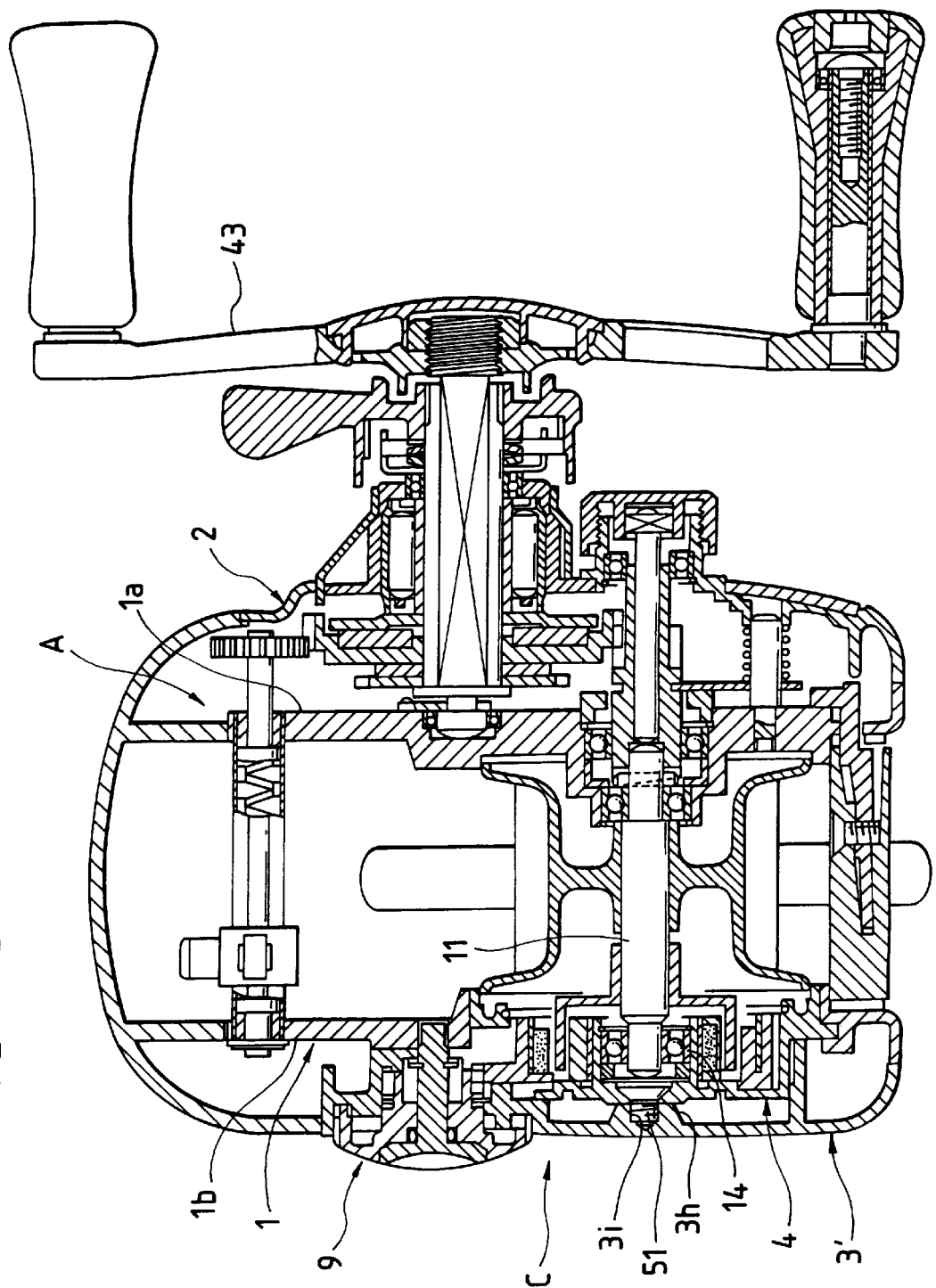
FIG. 13 is a cross-sectional plan view of the double bearing type reel for fishing of the second example.

FIG. 13 is a view showing the second example. FIG. 13 is a cross-sectional plan view of the double bearing type reel for fishing.

In the second example, the attaching member made up of the cover described in the first example is formed integrally with the left side plate.

There is provided a protruding section 3h inside the left side plate 3', and also there is provided a screw hole 3i in the protruding section 3h.

There is provided a screw 51 in the attaching member 4 made up of the bearing support member. This screw 51 is screwed into the screw hole 3i, so that the attaching member 4 can be fastened to the left side plate 3'.

Other points of the second example are substantially the same as those of the first example.

Figure 14:
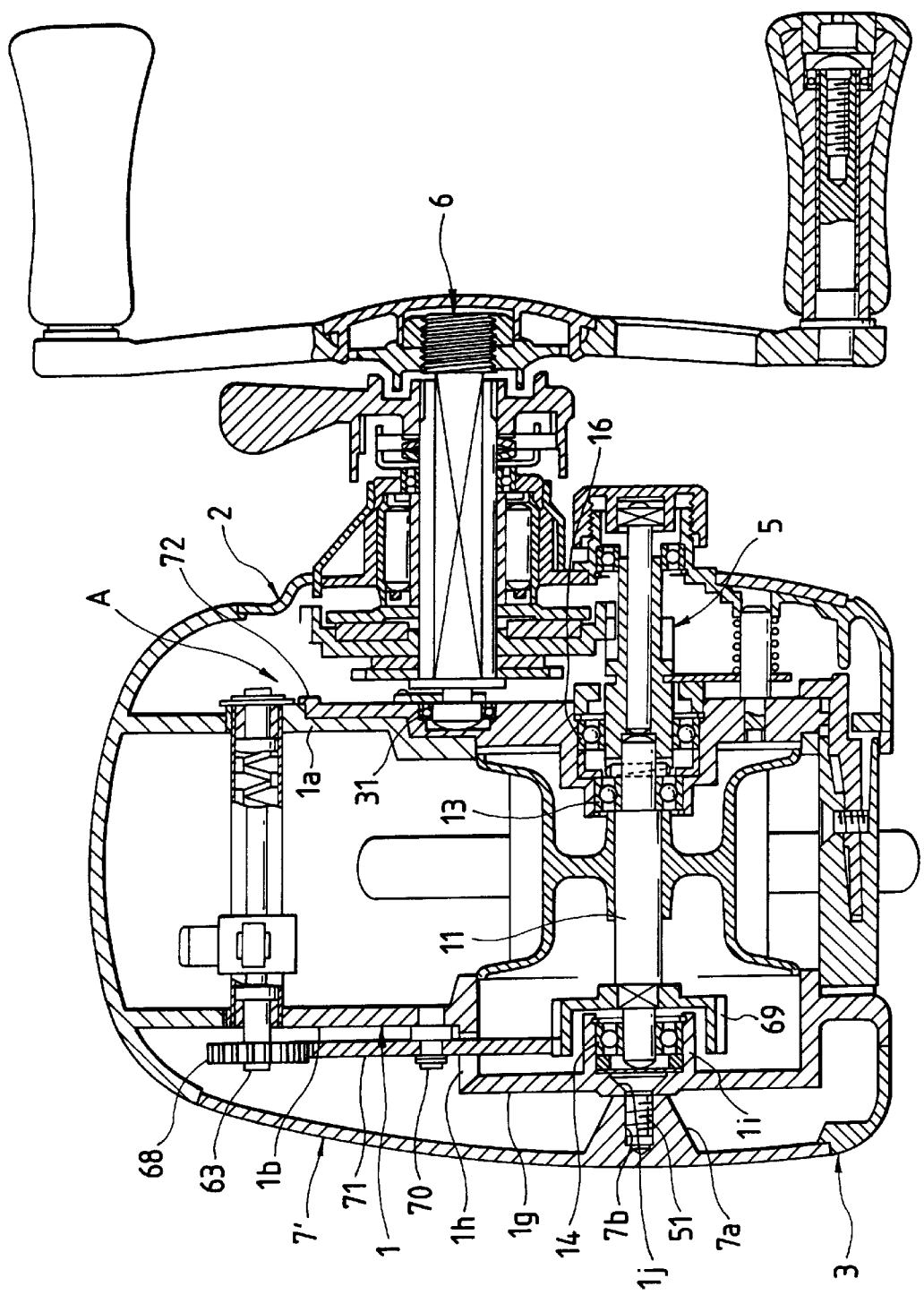
FIG. 14 is a cross-sectional plan view of the double bearing type reel for fishing of the third example.

FIG. 14 is a view showing the third example. FIG. 14 is a cross-sectional plan view of the double bearing type reel for fishing.

In the third example, the attaching member made up of the bearing support member described in the first example is formed integrally with the left frame 1b.

There is provided a bearing support section 1g outside the left frame 1b.

There is provided an opening 1h on the side of the bearing support section 1g, and also there is provided a bearing support cylinder 1i inside the bearing support section 1g.

There is provided a conic through-hole 1j on the bottom surface of the bearing support cylinder 1i.

On the bearing 14 side of the spool shaft 11, there is provided a locking section in which a gear 69 is fixed.

There is provided a shaft section 70 outside the left frame 1b. In the shaft section 70, a gear 71 is supported, which is meshed with the gear 69.

There is provided a gear 68 at one end of the traverse shaft 63 of the level winding device D arranged on the front side of the frame 1. This gear 68 is meshed with the gear 71.

There is provided an attaching member 7' made up of a cover outside the left side plate 3. The attaching member 7' is fastened to the outside of the left side plate 3 when one screw 51 is screwed into the screw hole 7b.

The left side plate 3 is detachably attached to the frame 1 by a screw not shown in the drawing.

A supporting plate 72 is detachably attached to the right frame 1a, so that the spool 12 can be taken out from the device.

On the supporting plate 72, there are provided a bearing 13 to support the spool shaft 11, bearing 16 to support the pinion 5, and bearing 31 to support the drive shaft 6.

Other points of the third example are substantially the same as those of the first example.

Figure 15:
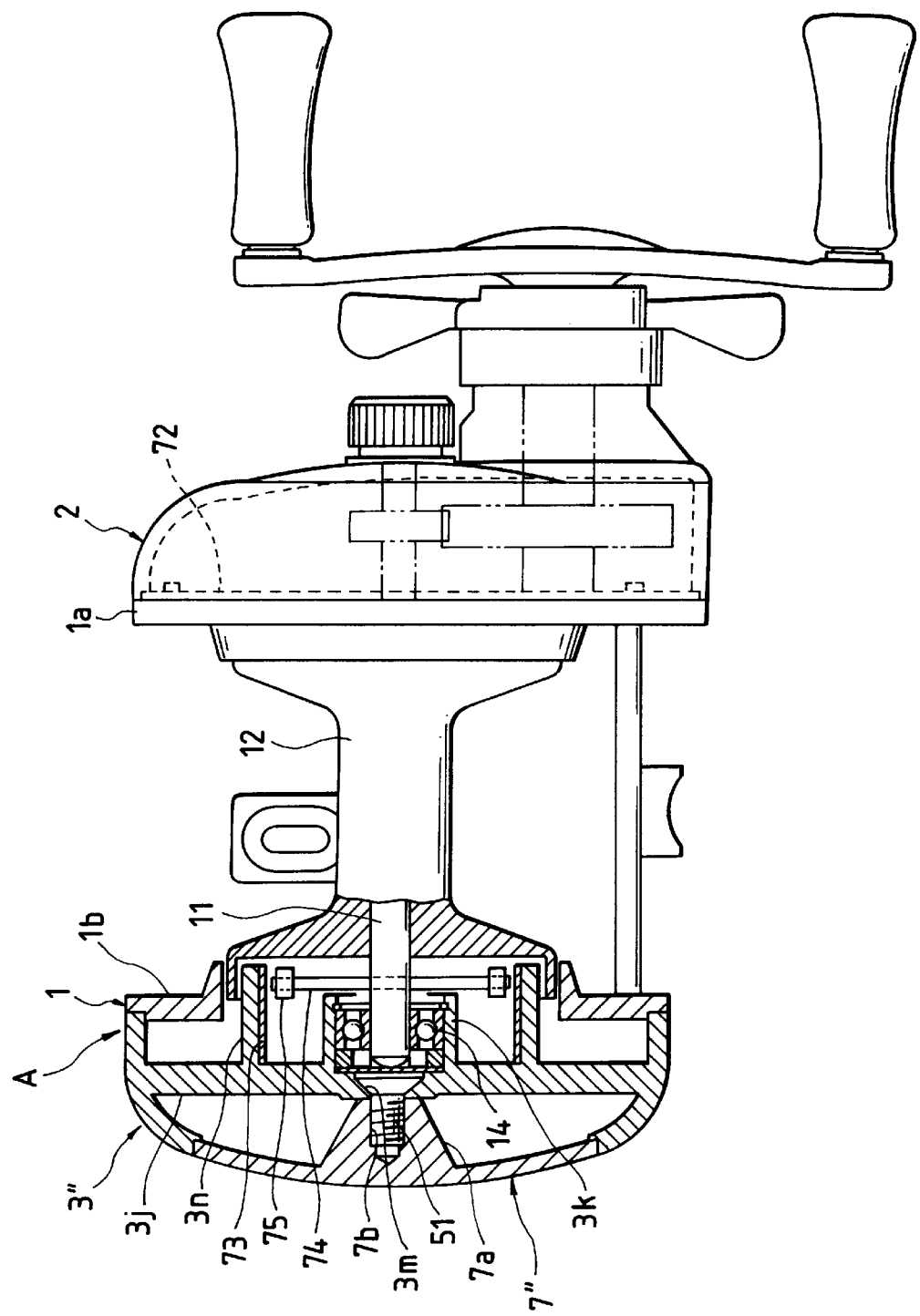
FIG. 15 is a cross-sectional rear view of the primary portion of the double bearing type reel for fishing of the fourth example.

FIG. 15 is a view showing the fourth example. FIG. 15 is a cross-sectional rear view of the primary portion of the double bearing type reel for fishing.

In the fourth example, the attaching member made up of the bearing support member described in the first example is formed integrally with the left side plate.

There is provided a partition plate 3j inside the left side plate 3".

There is provided a bearing support cylinder 3k inside the partition plate 3j. There is formed a conic through-hole 3m on the bottom surface of the bearing support cylinder 3k.

There is provided a cylindrical section 3n outside the bearing support cylinder 3k, and a metallic ring 73 is fixed onto the inner circumference of the cylindrical portion 3n.

A guide rod 74 is fixed to the spool shaft on the bearing 14 side, and a centrifugal brake piece 75 is movably engaged with the guide rod 74.

An attaching member 7" made up of a cover is set outside the left side plate 3". When one screw 51 is screwed into a screw hole 7b, the attaching member 7 is fastened onto the left side plate 3".

The left side plate 3" is detachably attached to the frame 1 by a screw not shown in the drawing.

Also, in the fourth example, a support plate 72 is detachably attached to the right frame 1a, so that the spool 12 can be taken out.

Other points of the fourth example are substantially the same as those of the first example.

In the arrangement described above, the rolling type one way clutch B is incorporated onto the outer circumference of the drive shaft 6, however, this rolling type one way clutch B may be omitted.

In the arrangement described above, the right frame 1a, the left frame 1b, the reel 1c and the stationary plate 1d are integrally formed, however, they may be separately formed, and both frames 1a, 1b may be held in parallel with each other.

According to the foregoing examples of the present invention, the following effects can be provided.

The attaching member made up of the bearing support member attached inside the left side plate, and the attaching member made up of the cover attached outside the left side plate are fastened to each other by one screw from the inside of the bearing mounted on the spool shaft for supporting the spool. That is, the attaching members are fixed to each other at one position. Due to the foregoing arrangement, it is possible to prevent the members from inclining, so that the assembling accuracy can be enhanced. Since the fastening work is conducted at one position, the work efficiency can be enhanced, and the cost can be reduced. Further the beauty of the reel can be improved.

Referring to the fifth example shown in FIGS. 16 to 23, the present invention will be explained below.

Reel body A includes: a frame body 101; a right side plate 102 attached to a side frame 101a of the frame body 101; and a left side plate 102' attached to a side frame 101b of the frame body 101, wherein a front cover 110 is attached to the front side.

The frame 101 includes: both side frames 101a, 101b; a support not shown in the drawing; and a fixing plate 101d for fixing a reel leg 101c, wherein these members are integrated into one unit, and both side frames 101a, 101b are held in parallel with each other.

Between both side frames 101a and 101b, there is provided a spool 112 fixed to a spool shaft 111 so that the spool 112 can be rotated. The spool shaft 111 is rotatably supported by one bearing 113 provided in a shaft cylinder 101e on the right frame 101a side, and the other bearing 114 provided in an attaching member 104 made up of a bearing support member provided on the left frame 101b side.

A magnetic brake cylinder 115 is fixed on the outer circumference of the spool shaft 111 on the bearing 114 side.

A shaft cylinder 104a of large diameter of the pinion 104 is rotatably supported by another bearing 116 attached in the shaft cylinder 101e on the right frame 101a side, wherein the shaft cylinder 104a can be moved in the axial direction. A shaft cylinder 104b of small diameter of the pinion 104 is rotatably supported by a bearing 117 attached in the shaft cylinder 102e on the right side plate 102 side, wherein the shaft cylinder 104b can be moved in the axial direction.

A pushing shaft rod 118 is movably engaged in a central hole 104c of the pinion 104 while the pushing shaft rod 118 can be moved in the axial direction.

On both sides of the spool shaft 111, there are provided small diameter portions to be respectively supported by the bearings 113, 114, and a small diameter portion of the bearing 114 comes into contact with a thrust bearing 119.

An engaging protrusion 120 of a pin forming a clutch mechanism is fixed to the small diameter portion protruding to the right from the bearing 113. This small diameter portion is inserted into a large diameter hole 104d of the pinion 104 and comes into contact with one side of the pushing shaft rod 118.

On one end surface of the shaft cylinder 104a of large diameter of the pinion 104, there is provided an engaging groove 104e forming the clutch mechanism, wherein the engaging groove 104e is formed in a direction perpendicular to the axis. The engaging protrusion 120 is detachably inserted into the engaging groove 104e.

On the outer circumference of the shaft cylinder 102a on the right side plate 102, there is provided a screw portion. A pushing knob 121 is screwed into the screw portion. In the pushing knob 121, there is formed an elliptical recess used for locking. In this elliptical recess used for locking, a locking portion on the other side of the pushing shaft rod 118 is engaged, and at the same time, the end on the other side of the pushing shaft rod 118 comes into contact with a thrust bearing 122 arranged in the pushing knob 121.

There are provided pinion teeth 104f and a circumferential groove 104g on the outer circumference of the shaft cylinder 104a of large diameter of the pinion 104. A drive gear 123 mounted on the drive shaft 105 is meshed with the pinion teeth 104f.

An operation plate 124 forming the clutch mechanism is engaged with the circumferential groove 104g.

On the outside of the right frame 101a, there is provided a support 125, which is inserted into the operation plate 124 and the spring 126. The operation plate 124 is pushed by the spring 126 so that the engaging protrusion 120 of the spool shaft 111 can be engaged in the engaging groove 104e of the pinion 104.

There is rotatably provided a clutch operation ring 127 at the hole edge of the right frame 101a on the outside of the shaft cylinder 104a of large diameter of the pinion 104. This clutch operation ring 127 comes into contact with the operation plate 124. A clutch operation lever 128 is connected to this clutch operation ring 127.

Between both frame portions 101a and 101b arranged at the rear of the frame 101, there is provided a finger setting section 129 capable of moving in the vertical direction. One end of the clutch operation lever 128 is fixed to the finger setting section 129 by a screw 130.

The clutch operation ring 127 is provided with a cam (not shown) by which the operation plate 124 is operated.

The drive shaft 105 is supported by a bearing 131 provided in the right frame 101a and a bearing 133 supported by the drive support section 132 attached to the right side plate 102, wherein the drive support section 132 can be freely moved in the axial direction. There is provided a drag adjustment knob 134 which is screwed to the screw section 105a of the drive shaft 105 on the right outside of the bearing 133.

A cylindrical section of the drag adjustment knob 134 comes into contact with the bearing 133 via spring plates 135, 136.

The drive shaft 105 includes: a large diameter section 105b engaged with the bearing 131, small diameter section 105c, flange section 105d, elliptical locking section 105e, and screw section 105f.

The bearing 131 is inserted into a recess of the right frame section 101a and prevented from coming off by a fixing plate 137.

One end of the large diameter section 105b comes into contact with a thrust bearing 138.

On the outer circumference of the locking section 105e, there are provided a claw wheel 139, friction plate 140, drive gear 123, pushing plate 141, and collar 142. In this arrangement, the claw wheel 139, pushing plate 141 and collar 142 are engaged with the drive shaft 105 so that they can not be rotated round the drive shaft 105.

A handle 6 and nut 143 are screwed to the screw section 105f.

Rotation of the nut 143 is checked by the locking section 107a of a nut cover 107. The engaging section 107b of the nut cover 107 is inserted into and engaged with the engaging hole of a handle 106.

A drag brake mechanism is composed in such a manner that a friction member 144 is interposed between the drive gear 123 and the pushing plate 141.

On the outer circumference of the collar 142, there are provided a plurality of rod-shaped rolling members 145 of a rolling type one way clutch B.

The rolling type one way clutch B is supported by the drive support section 132.

By the action of the rolling type one way clutch B, it is possible to rotate the handle 106 in a rational direction in which a fishing line (not shown) is wound round the spool 112, and it is impossible to rotate the handle 106 in the reverse direction.

A substantially annular cover 108 is engaged on the outer circumference of the end portion of the drive support section 132 on the drag adjustment knob 134 side. An engaging section 108a of the cover 108 is inserted into and calked with the engaging hole 102b on the right side plate 102.

The drive support section 132, the outer circumference of which is protruded at the position of the rod-shaped rolling member 145, is covered with the cover 108 and reinforced by the right side plate 102.

Figure 18:
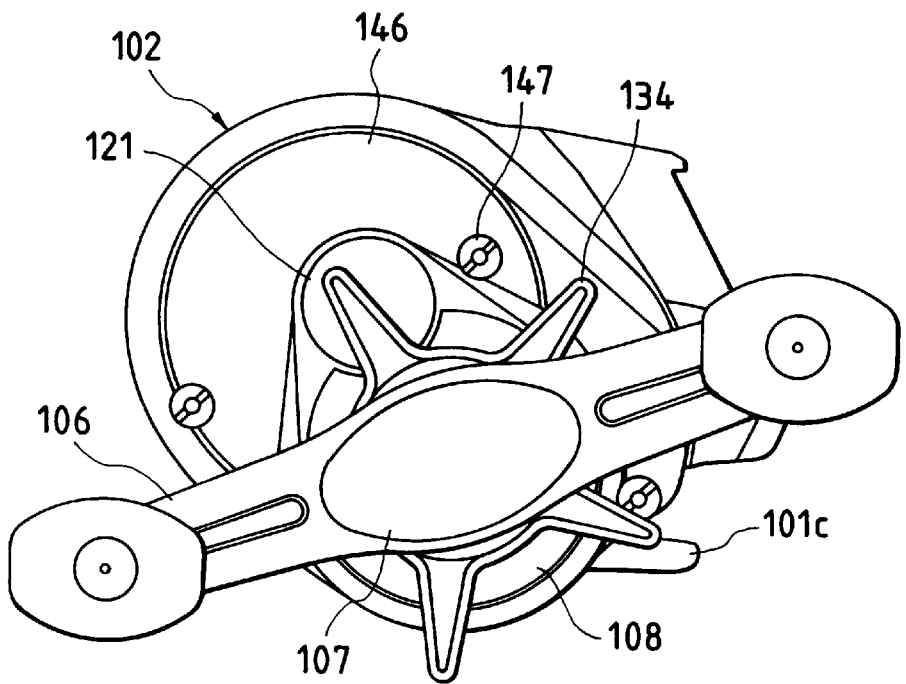
FIG. 18 is a side view of the double bearing type reel for fishing on the handle side of the fifth example.
Figure 19:
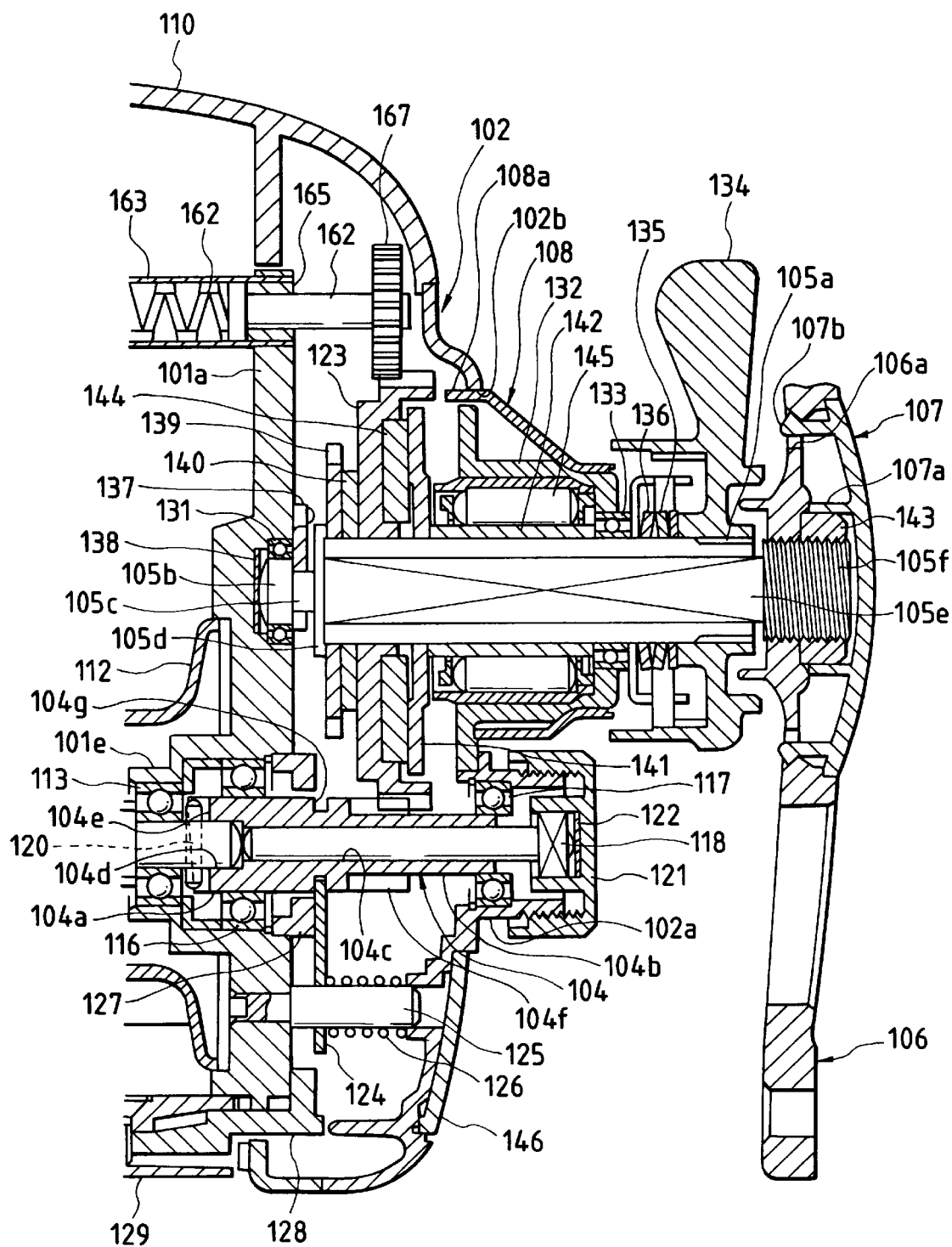
FIG. 19 is an enlarged cross-sectional plan view of the double bearing type reel for fishing of the fifth example on the handle side.

As illustrated in FIG. 18, a cover 146 is fixed onto the surface of the right side plate 102 outside the shaft cylinder 102a to which the pushing knob 121 is screwed, by means of calking in the same manner as that of the cover 108.

In this connection, the cover 146 may be fixed onto the right side plate 102 by the screw 147 used for attaching the right side plate 102 to the right frame 101a.

The method of fixing the covers 108, 146 onto the right side plate 102 is not limited to the method of calking, but other methods such as a method of press-fitting or adhesion may be adopted.

Figure 20:
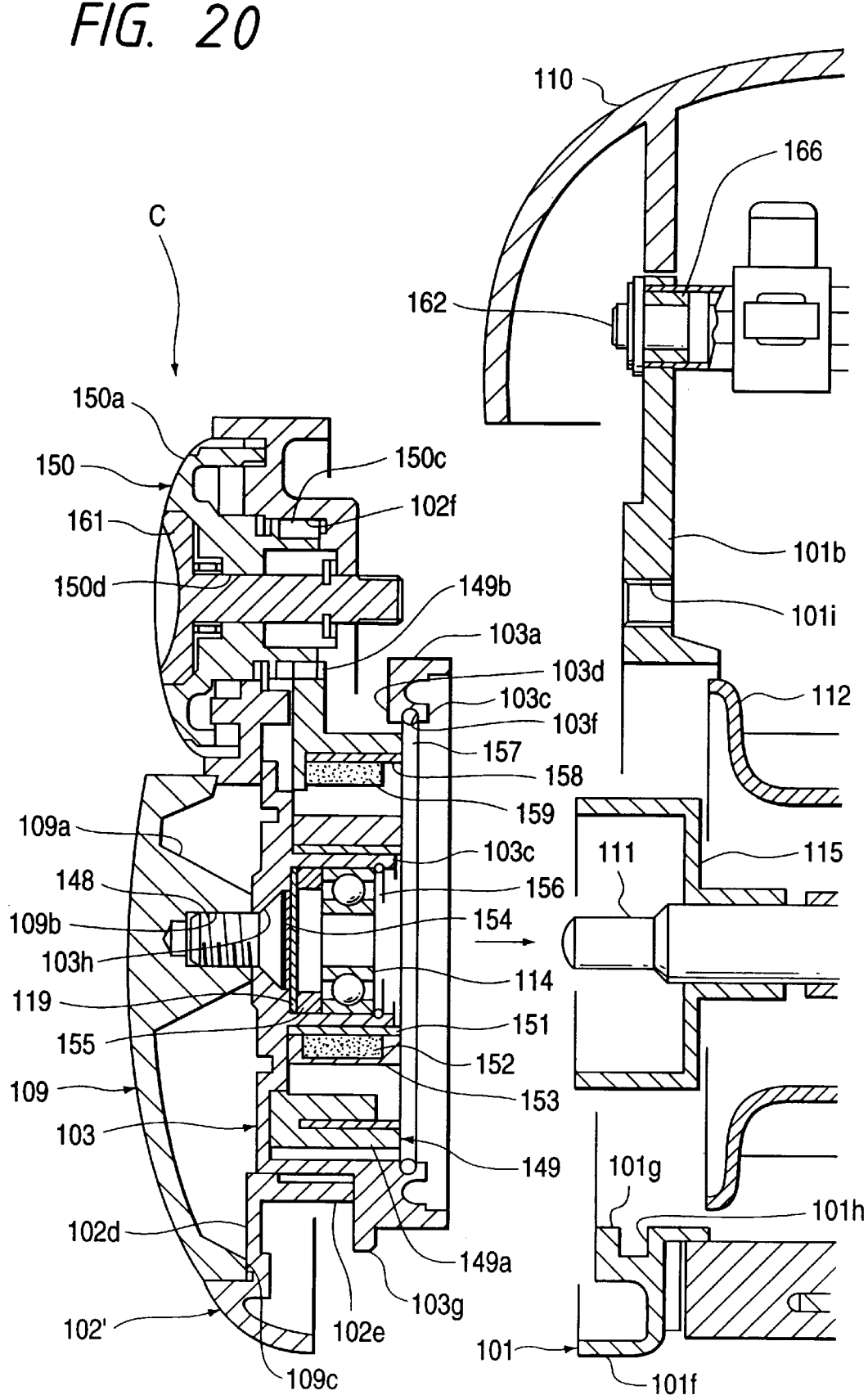
FIG. 20 is an enlarged exploded cross-sectional plan view of the double bearing type reel for fishing of the fifth example on the side opposite to the handle side.
Figure 21:
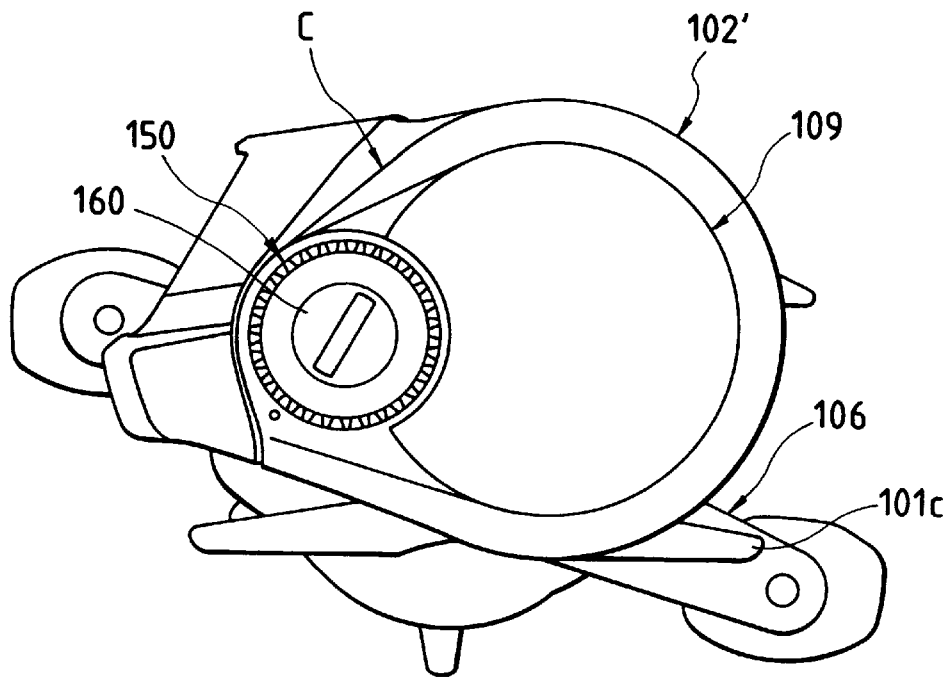
FIG. 21 is a side view of the double bearing type reel for fishing of the fifth example on the side opposite to the handle side.
Figure 22:
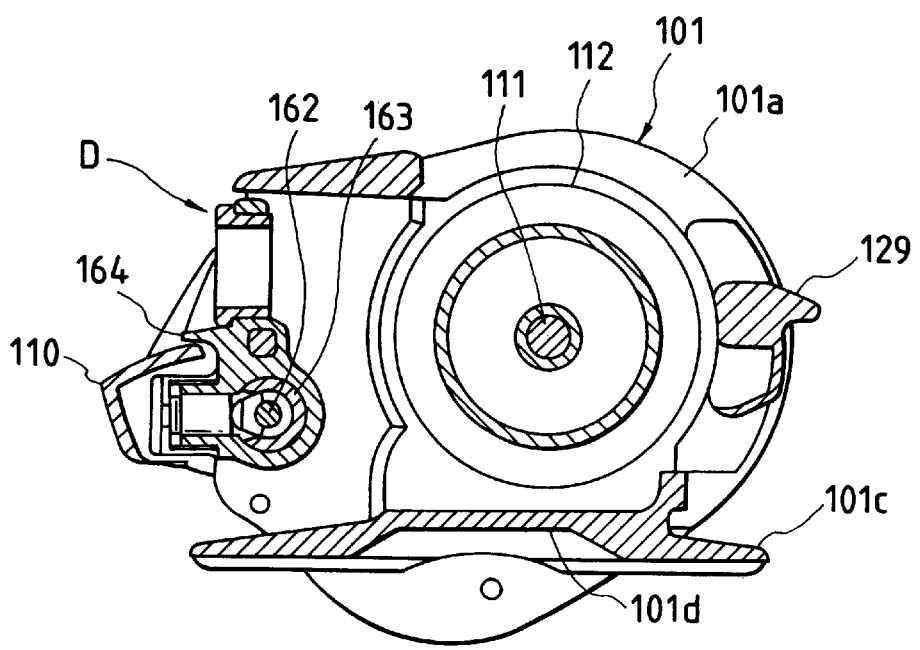
FIG. 22 is a cross-sectional side view of the double bearing type reel for fishing of the fifth example on the inside of the side frame.

As shown in FIG. 20, the bearing support member 103 to which the bearing 114 is attached is fastened to the cover 109 by one screw 148 in such a manner that the left side plate 102' is interposed between the bearing support member 103 and the cover 109.

The attaching unit C includes: the left side plate 102', bearing support member 103, cover 109, magnetic brake member 149, and brake adjustment knob 150. This attaching unit C is attached to the left frame 101b.

Figure 17:
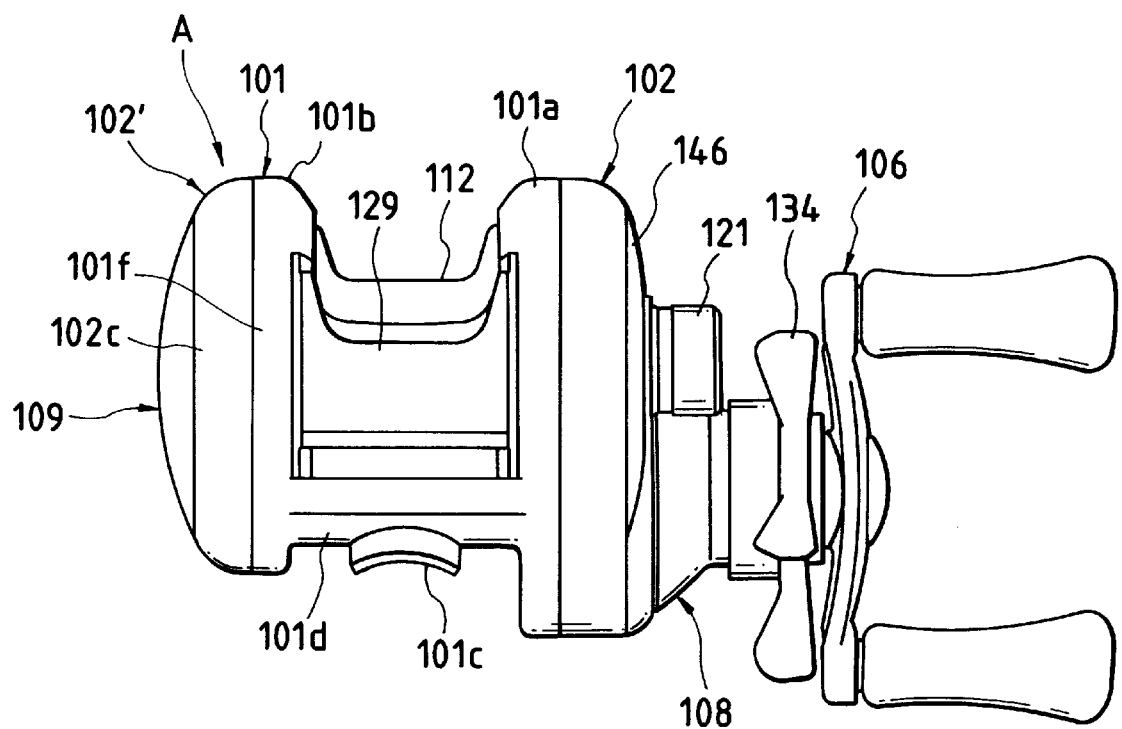
FIG. 17 is a rear view of the double bearing type reel for fishing of the fifth example.
Figure 23:
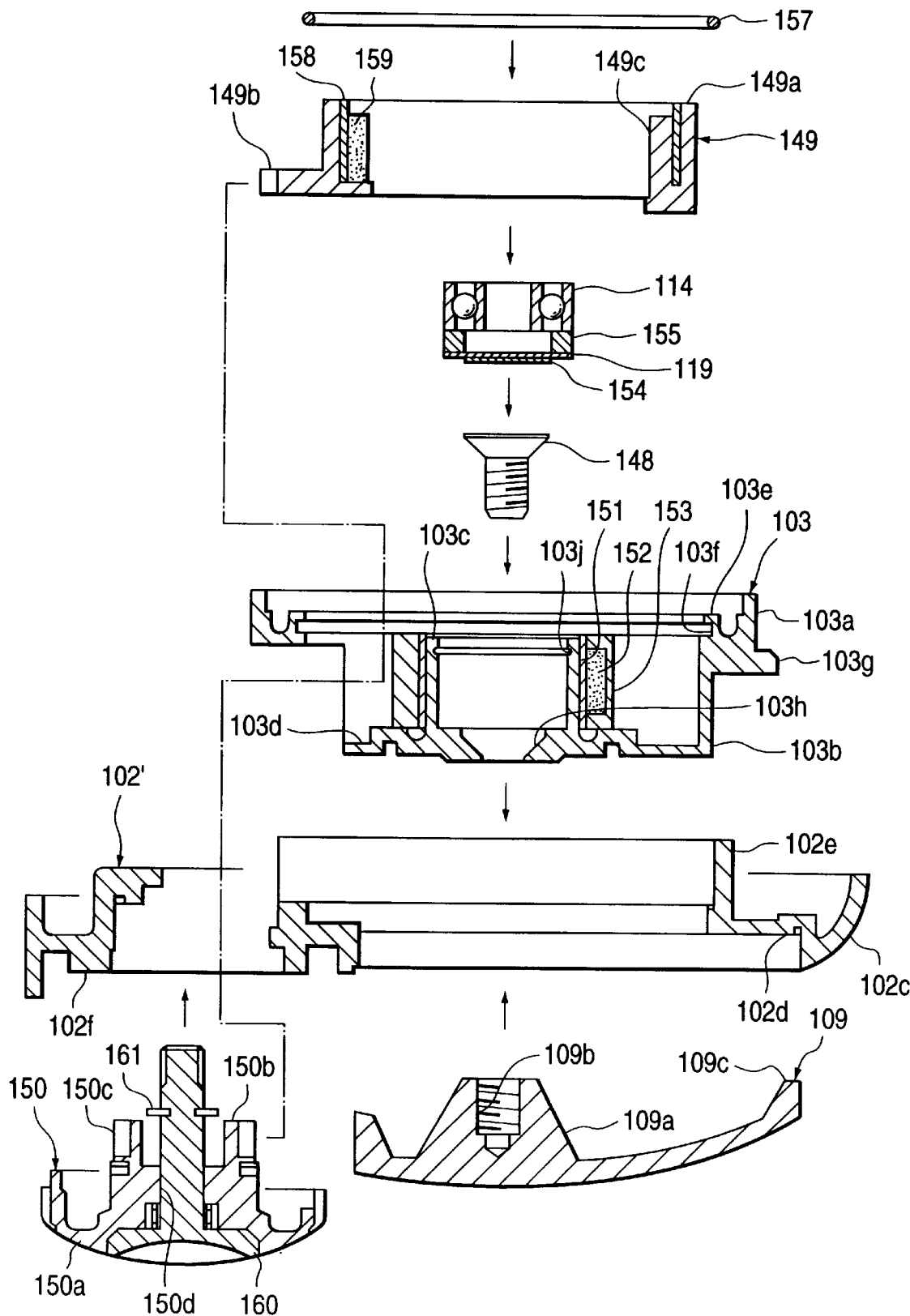
FIG. 23 is an exploded cross-sectional plan view of the attaching unit of the double bearing type reel for fishing of the fifth example.

As shown in FIGS. 17, 20 and 23, in the left frame 101b, there are provided an outer circumferential section 101f extending toward the left side plate 102' and a through-hole 101g of large diameter. At the opening edge of the through-hole 101g of large diameter, there are provided a plurality of engaging recesses 101h.

There is provided a screw hole 101i outside the through-hole 101g of large diameter in the left frame 101b.

As shown in FIGS. 16, 17, 20 and 23, on the left side plate 102', there are provided an outer circumferential section 102c, engaging section 102d, and cylindrical sections 102e, 102f which are arranged inside.

Figure 16:
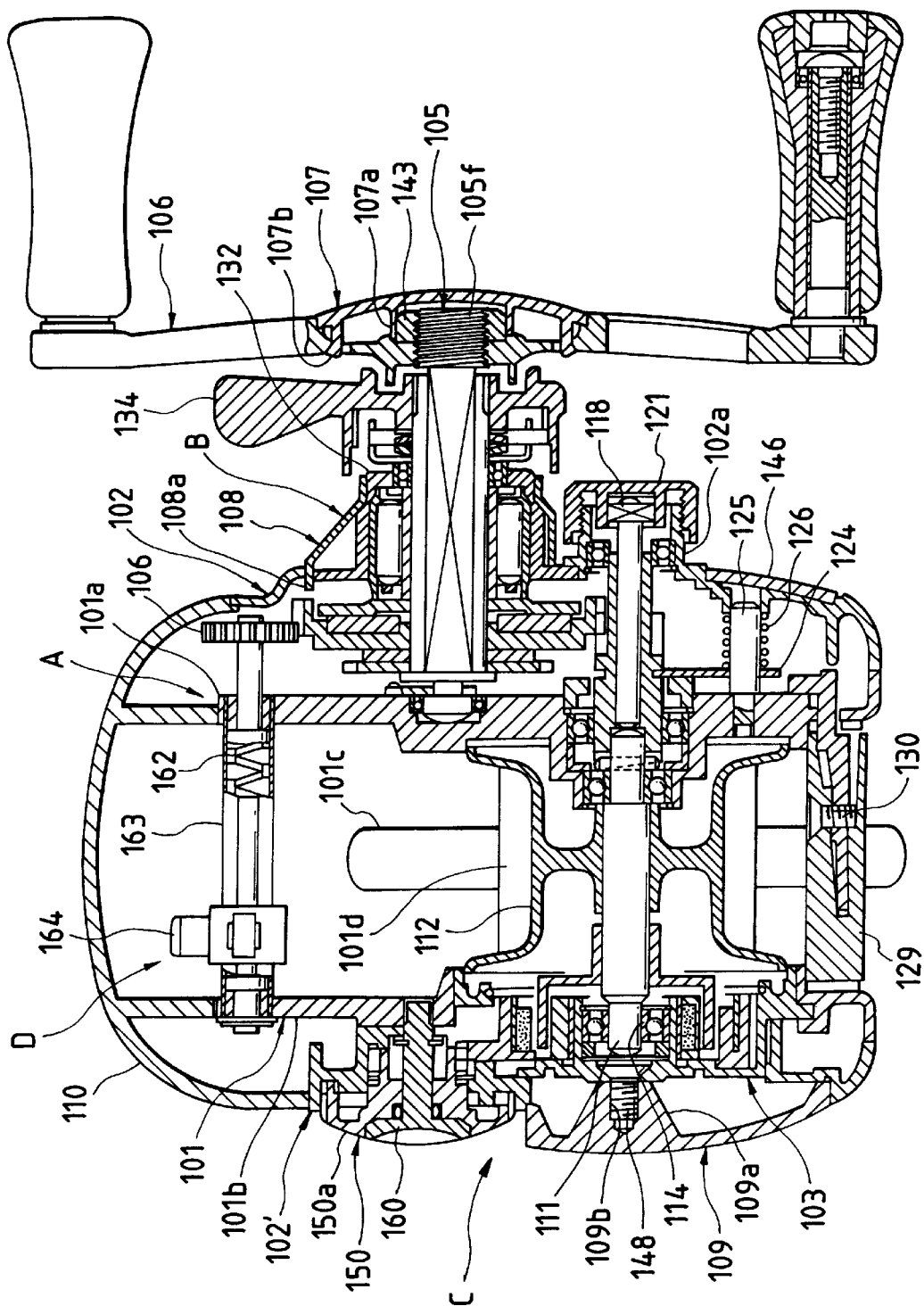
FIG. 16 is a cross-sectional plan view of the double bearing type reel for fishing of the fifth example.

As illustrated in FIGS. 16 and 20, the bearing support member 103 includes: a large diameter section 103a, and a bearing support cylinder 103c arranged inside which is formed into a C-shape in the large diameter 103a and the intermediate diameter section 103b.

Outside the intermediate diameter section 103b, there is provided an opening 103d which is formed by a cutout.

Inside the large diameter section 103a, there is provided an annular bank-shaped portion 103e. Inside the annular bank-shaped portion 103e, there is provided an engaging groove 103f.

On the rear side of the outer circumference of the large diameter section 103a, there are provided a plurality of engaging protrusions 103g.

On the bottom surface of the bearing support cylinder 103c, there is provided a conic through-hole 103h. At the opening edge of the bearing support cylinder 103c, there is provided an engaging groove 103i.

A ring 151 made of magnetic material is fixed onto the outer circumference of the bearing support cylinder 103c.

A cylindrical body 153 into which a plurality of magnets 152 are inserted is engaged with and fixed to the outer circumference of the ring 151.

The ring 151 made of magnetic material and the magnets 152 may be inserted into the bearing support member 103.

In the bearing support cylinder 103c, there are provided a screw 148, spacer 154, thrust bearing 119, spacer 155 and bearing 114, which are prevented from coming off from the bearing support cylinder 103c by an engaging ring 156.

The magnetic brake member 149 is inserted into the intermediate diameter section 103b and prevented from coming off by an engaging ring 157 engaged in the engaging groove 103f.

The cover 109 is formed into a curved shape. Inside the cover 109, there is provided a protruding section 109a. In the protruding section 109a, there is provided a screw hole 109b. In the periphery, there is provided an annular engaging section 109c.

The magnetic brake member 149 includes: a cylindrical section 149a, tooth section 149b protruding from the outer circumference of the cylindrical section 149a, and inner circumferential section 149c in the cylindrical section 149a. In this structure, the ring 158 made of magnetic material and the plurality of magnets 159 are subjected to insert formation.

There is provided a brake adjustment knob 150, which includes an operating section 150a arranged on the outer circumference, shaft cylinder section 150b, tooth section 150c arranged on the outer circumference of the shaft cylinder section 150b, and central through-hole 150d.

A screw 160 having a head portion is inserted into the central through-hole 150d and prevented from coming off by an E ring 161.

The covers 108, 146, 109 are made of metal or resin.

In accordance with the combination of the material of the right side plate 102 and the left side plate 102' with the material of the covers 108, 146, 109, the following effects can be provided. When the color of the side plates is different from the color of the cover, the cubic effect can be emphasized.

(1) When the side plates 102, 102' are made of resin and the covers 108, 146, 109 are made of metal, it is possible to enhance the effect of reinforcement and it is also possible to improve the appearance.

(2) When the side plates 102, 102' are made of resin and the covers 108, 146, 109 are also made of resin, it is possible to enhance the effect of reinforcement and it is also possible to improve the appearance. Further, the reel can be handled more easily and softly.

(3) When the side plates 102, 102' are made of metal and the covers 108, 146, 109 are also made of metal, it is possible to enhance the effect of reinforcement and it is also possible to improve the appearance.

(4) When the side plates 102, 102' are made of metal and the covers 108, 146, 109 are made of resin, it is possible to enhance the effect of reinforcement and it is also possible to improve the appearance. Further, the reel can be handled more easily and softly.

When metallic material is used for the reel, the surfaces of the members forming the reel are subjected to alumite treatment or coating treatment.

When resin material is used for the reel, surfaces of the members forming the reel are used as they are, or alternatively surfaces of the members forming the reel are subjected to coating treatment.

Between both side frames 101a and 101b in the front section of the frame 101, there is provided a level winding device D.

Level winding device D includes: a traverse shaft 162, guide cylinder 163, and fishing line guide body 164 sliding on the outer circumference of the guide cylinder 163 in the transverse direction.

The traverse shaft 162 is supported by the right 165 and the left bearing 166 arranged in the guide cylinder 163.

A gear 167 is attached to one end of the traverse shaft 162. This gear 167 is meshed with a drive gear 123.

When the attaching unit C is assembled, the bearing support member 103 is set inside the left side plate 102', and the cover 109 is set outside, and then both members are fastened to each other by a screw 148 which is screwed into a screw hole 109b.

Next, the magnetic brake member 149 is inserted into the bearing support member 103 and prevented from coming off by an engaging ring 157.

Into the bearing support cylinder 103c, there are inserted a screw 148, spacer 154, thrust bearing 119, spacer 155 and bearing 114, which are prevented from coming off by an engaging ring 156.

The brake adjustment knob 150 is inserted into the cylindrical section 102f, and the tooth section 149b is meshed with the tooth section 150c.

When the attaching unit C is attached to the frame 101, the bearing support member 103 is inserted into the through-hole 101g of large diameter in the left frame 101b and rotated. Therefore, the plurality of engaging protrusions 103g are engaged with the plurality of engaging recesses 101h, and the screw 160 inserted into the central through-hole 150d of the brake adjustment knob 150 is screwed into the screw hole 101i.

When the attaching unit C is attached to the frame 101, the spool shaft 111 is inserted into the bearing 114, and the magnetic brake cylinder 115 is arranged between the magnets 152 and 159.

In the above arrangement, the bearing support member 103 is provided with a plurality of engaging protrusions 103g, which are engaged with the plurality of engaging recesses 101h. However, it is possible to provide a plurality of engaging protrusions on the left side plate 102', and the plurality of engaging protrusions may be engaged with the plurality of engaging recesses 101h.

Due to the above arrangement of the double bearing type reel for fishing, it is possible to reinforce the right side plate 102 at the position of the drive support section 132 covered with the cover 108 and also at the position of the cover 146. Therefore, the mechanical strength and durability can be enhanced, and the reel for fishing can stably exhibit its function over a long period of time.

When materials of the covers 108, 146 are appropriately selected and surface treatment is appropriately conducted, it is possible to improve the beauty of the reel, and further the reel can be handled easily, that is, it is possible to provide a high-grade reel for fishing that can be handled easily.

Concerning the cover 109, the appearance can be improved and its handling property can be enhanced. In this way, it is possible to provide a high-grade reel for fishing by the present invention.

In the arrangement described above, the rolling type one way clutch B is incorporated onto the outer circumference of the drive shaft 105, however, this rolling type one way clutch B may be omitted.

In the arrangement described above, the right frame 101a, the left frame 101b, the reel 101c and the fixing plate 101d are integrally formed, however, they may be separately formed, and both frames 101a, 101b may be held in parallel with each other.

According to the fifth example of the present invention, the following effects can be provided.

It is possible to reinforce the right side plate at the position of the drive support section covered with the cover. Therefore, the mechanical strength and durability can be enhanced, and the reel for fishing can stably exhibit its function over a long period of time.

When materials of the covers are appropriately selected and surface treatment is appropriately conducted, it is possible to improve the beauty of the reel, and further the reel can be handled easily, that is, it is possible to provide a high-grade reel for fishing that can be handled easily.

Referring to the sixth example shown in FIGS. 24 to 27, the present invention will be explained below.

Reel body A includes: a frame body 201; a right reel side plate 202 attached to an inside plate 201a of the frame body 201; and a left reel side plate 202' attached to an inside plate 201b of the frame body 201, wherein a front cover 210 is attached to the front side.

The frame 201 includes: both inside plates 201a, 201b; a support not shown in the drawing; and a fixing plate 201d for fixing a reel leg 201c, wherein these members are integrated into one unit, and both inside plates 201a, 201b are held in parallel with each other.

Between both inside plates 201a and 201b, there is provided a spool 212 fixed to a spool shaft 211 so that the spool 212 can be rotated. The spool shaft 211 is rotatably supported by one bearing 213 provided in a shaft cylinder 201e on the right inside plate 201a side, and the other bearing 214 provided in a bearing support member 203 attached onto the left inside plate 201b side.

A magnetic brake cylinder 215 is fixed on the outer circumference of the spool shaft 211 on the bearing 214 side.

A shaft cylinder 204a of large diameter of the pinion 204 is rotatably supported by another bearing 216 attached in the shaft cylinder 201e on the right inside plate 201a side, wherein the shaft cylinder 204a can be moved in the axial direction. A shaft cylinder 204b of small diameter of the pinion 204 is rotatably supported by a bearing 217 attached in the shaft cylinder 202e on the right reel side plate 202 side, wherein the shaft cylinder 204b can be moved in the axial direction.

A pushing shaft rod 218 is movably engaged in a central hole 204c of the pinion 204 while the pushing shaft rod 218 can be moved in the axial direction.

On both sides of the spool shaft 211, there are provided small diameter portions to be respectively supported by the bearings 213, 214, and a small diameter portion of the bearing 214 comes into contact with a thrust bearing 219.

An engaging protrusion 220 of a pin forming a clutch mechanism is fixed to the small diameter portion protruding to the right from the bearing 213. This small diameter portion is inserted into a large diameter hole 204d of the pinion 204 and comes into contact with one side of the pushing shaft rod 218.

On one end surface of the shaft cylinder 204a of large diameter of the pinion 204, there is provided an engaging groove 204e forming the clutch mechanism, wherein the engaging groove 204e is formed in a direction perpendicular to the axis. The engaging protrusion 220 is detachably inserted into the engaging groove 204e.

On the outer circumference of the shaft cylinder 202a on the right reel side plate 202, there is provided a screw portion. A pushing knob 221 is screwed into the screw portion. In the pushing knob 221, there is formed an elliptical recess used for locking. In this elliptical recess used for locking, a locking portion on the other side of the pushing shaft rod 218 is engaged, and at the same time, the end on the other side of the pushing shaft rod 218 comes into contact with a thrust bearing 222 arranged in the pushing knob 221.

There are provided pinion teeth 204f and a circumferential groove 204g on the outer circumference of the shaft cylinder 204a of large diameter of the pinion 204. A drive gear 223 mounted on the handle shaft 205 is meshed with the pinion teeth 204f. In this way, the drive mechanism is composed.

An operation plate 224 forming the clutch mechanism is engaged with the circumferential groove 204g.

On the outside of the right inside plate 201a, there is provided a support 225, which is inserted into the operation plate 224 and the spring 226. The operation plate 224 is pushed by the spring 226 so that the engaging protrusion 220 of the spool shaft 211 can be engaged in the engaging groove 204e of the pinion 204.

There is rotatably provided a clutch operation ring 227 at the hole edge of the right inside plate 201a on the outside of the shaft cylinder 204a of large diameter of the pinion 204. This clutch operation ring 227 comes into contact with the operation plate 224. A clutch operation lever 228 is connected to this clutch operation ring 227.

Between both inside plates 201a and 201b arranged at the rear of the frame 201, there is provided a finger setting section 229 capable of moving in the vertical direction. One end of the clutch operation lever 228 is fixed to the finger setting section 229 by a screw 230.

The clutch operation ring 227 is provided with a cam (not shown) by which the operation plate 224 is operated.

The handle shaft 205 is supported by a bearing 231 provided on the right inside plate 201a and a bearing 233 supported by the drive support section 232 attached to the right reel side plate 202, wherein the drive support section 232 can be freely moved in the axial direction. There is provided a drag adjustment knob 234 which is screwed to the screw section 205a of the handle shaft 205 on the right outside of the bearing 233.

A cylindrical section of the drag adjustment knob 234 comes into contact with the bearing 233 via spring plates 235, 236.

The handle shaft 205 includes: a large diameter section 205b engaged with the bearing 231, small diameter section 205c, flange section 205d, elliptical locking section 205e, locking section 205f, and screw section 205g.

The deformable absorbing member 237 made of a felt washer or rubber and the bearing 231 are inserted into the recess 201f on the right inside plate 201a as shown in FIGS. 1, 2 and 4, and these members are prevented from coming off by a locking plate 238.

The locking plate 238 is fixed onto the right inside plate 201a by screws 239.

An end surface of the base portion 205b comes into contact with the deformable absorbing member 237 so that the deformable absorbing member 237 can be deformed.

When the felt washer is utilized, it may be impregnated with oil.

On the outer circumference of the handle shaft 205, there are provided a-claw wheel 240, frictional plate 241, gear 242, drive gear 223, pushing plate 243 and collar 244. These members are engaged with the handle shaft 205. The claw wheel 240, pushing plate 243 and collar 244 are locked to the handle shaft 205 by the locking section 205e.

The handle 206 is engaged with the locking section 205f, so that the handle 206 can not be rotated. A nut 245 is screwed into the screw section 205g.

Rotation of the nut 245 is stopped by the locking section 207a of the nut cover 207, and the engaging section 207b of the nut cover 207 is inserted into and engaged with the engaging hole 206a of the handle 206.

The drag braking mechanism is composed in such a manner that a frictional member 246 is interposed between the drive gear 223 and the pushing plate 243.

There is provided a protrusion 242a on the side of the gear 242. This protrusion 242a is inserted into a through-hole 223a formed in the drive gear 223.

On the outer circumference of the collar 244, there are provided a plurality of rod-shaped rolling members 247 of a rolling type one way clutch B.

The rolling type one way clutch B is supported by the drive support section 232.

By the action of the rolling type one way clutch B, it is possible to rotate the handle 206 in a rational direction in which a fishing line (not shown) is wound round the spool 212, and it is impossible to rotate the handle 206 in the reverse direction.

A substantially annular cover 208 is engaged on the outer circumference of the end portion of the drive support section 232 on the drag adjustment knob 234 side. An engaging section 208a of the cover 208 is inserted into and calked with the engaging hole 202b on the right reel side plate 202.

The drive support section 232, the outer circumference of which is protruded at the position of the rod-shaped rolling member 247, is covered with the cover 208 and reinforced by the right reel side plate 202.

A cover 248 is fixed onto the surface of the right reel side plate 202 outside the shaft cylinder 202a to which the pushing knob 221 is screwed, by means of calking in the same manner as that of the cover 208.

In this connection, the cover 248 may be fixed onto the right reel side plate 202 by the screws used for attaching the right reel side plate 202 onto the right inside plate 201a.

The method of fixing the covers 208, 248 onto the right reel side plate 202 is not limited to the method of calking, but other methods such as a method of press-fitting or adhesion may be adopted.

Figure 26:
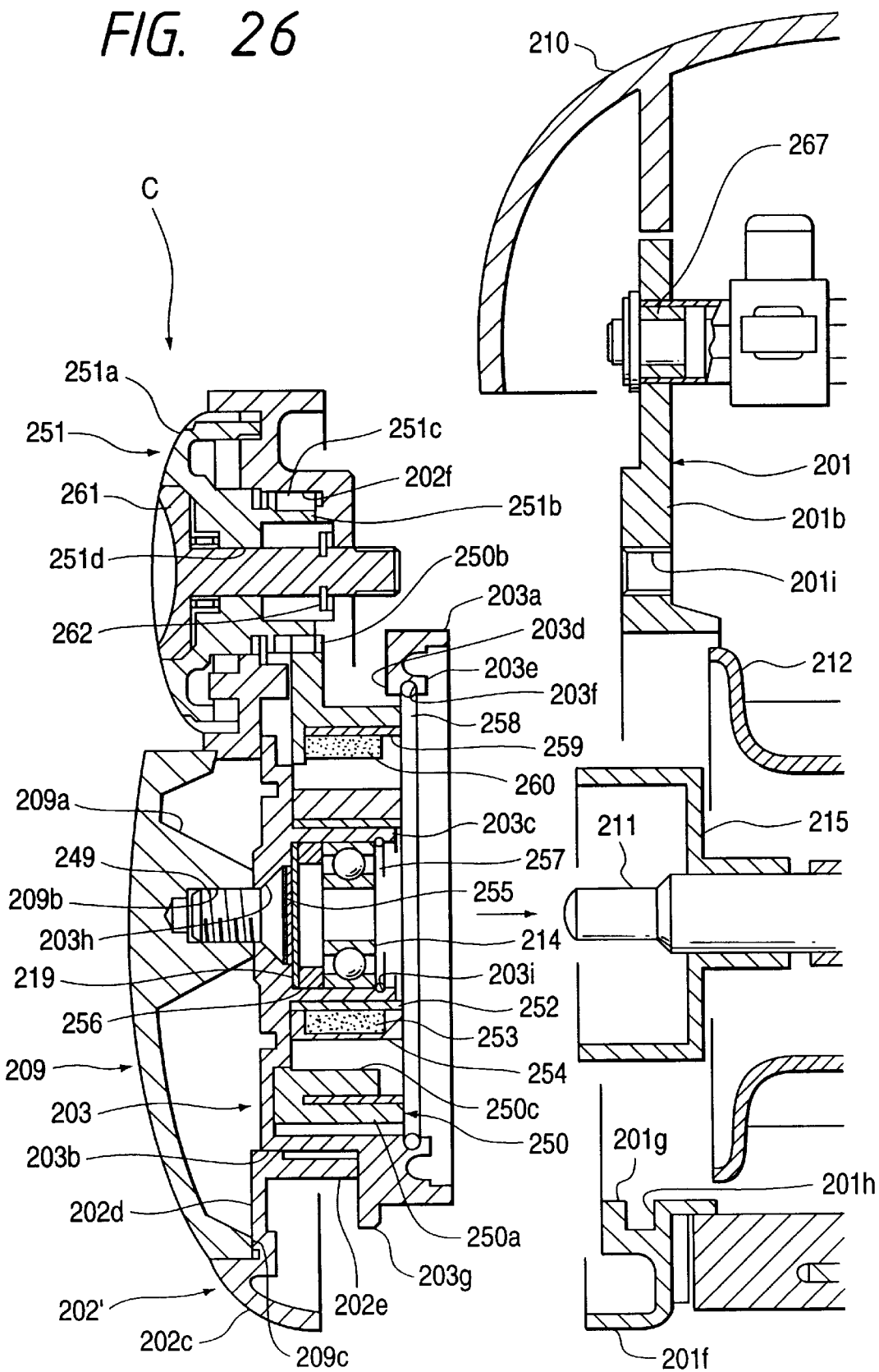
FIG. 26 is an enlarged exploded cross-sectional plan view of the double bearing type reel for fishing of the sixth example on the side opposite to the handle side.
Figure 27:
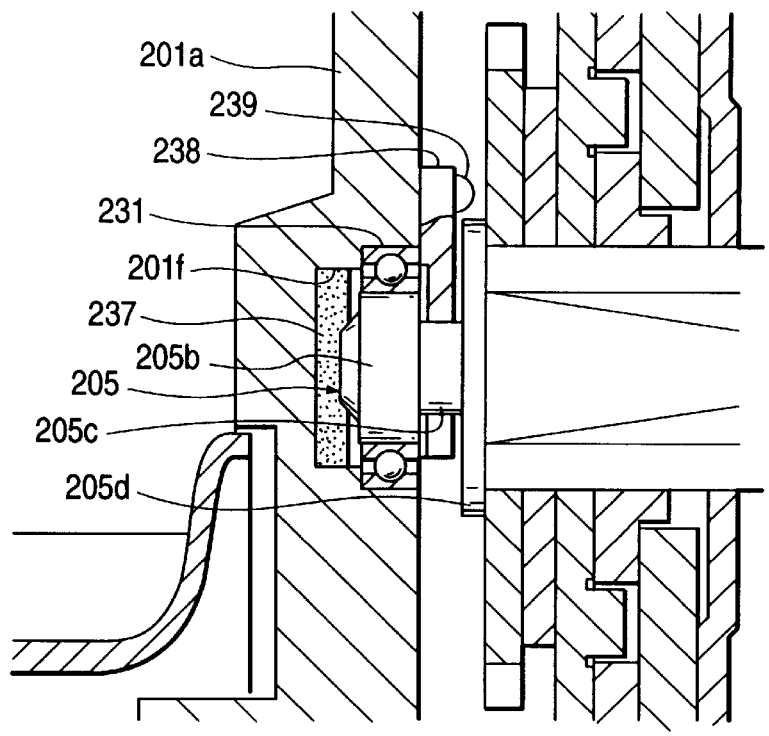
FIG. 27 is an enlarged cross-sectional plan view of the primary portion of the double bearing type reel for fishing of the sixth example.

As shown in FIG. 26, the bearing support member 203 to which the bearing 214 is attached is fastened to the cover 209 by one screw 248 in such a manner that the left reel side plate 202' is interposed between the bearing support member 203 and the cover 209.

The attaching unit C includes: the left side plate 202', bearing support member 203, cover 209, magnetic brake member 250, and brake adjustment knob 251. This attaching unit C is attached to the left inside plate 201b.

As shown in FIGS. 26, on the left inside plate 201b, there are provided an outer circumferential section 201g extending toward the left reel side plate 202' and a through-hole 201h of large diameter. At the opening edge of the through-hole 201h of large diameter, there are provided a plurality of engaging recesses 201i.

There is provided a screw hole 201i outside the through-hole 201h of large diameter on the left inside plate 201b.

Figure 24:
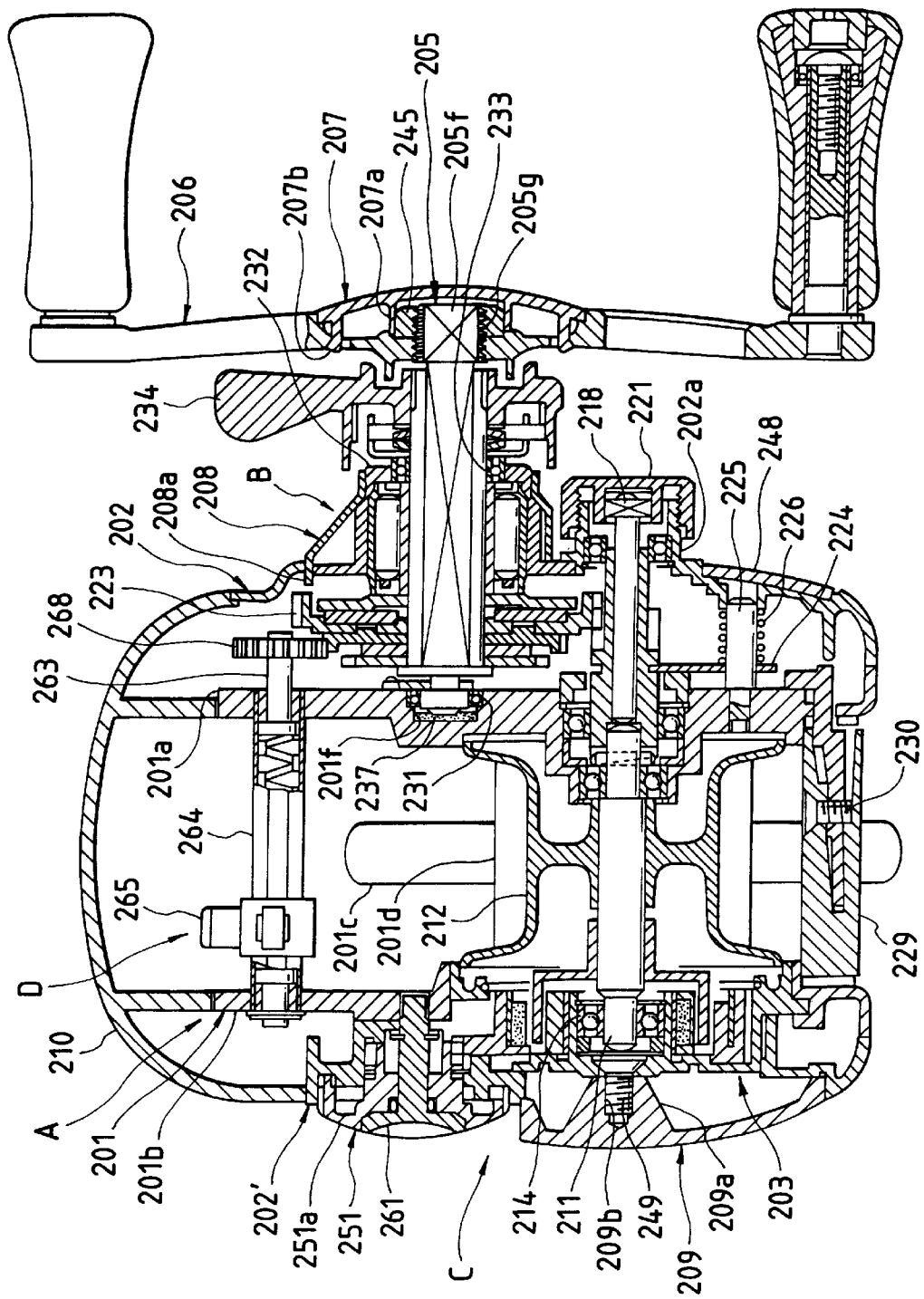
FIG. 24 is a cross-sectional plan view of the double bearing type reel for fishing of the sixth example.
Figure 25:
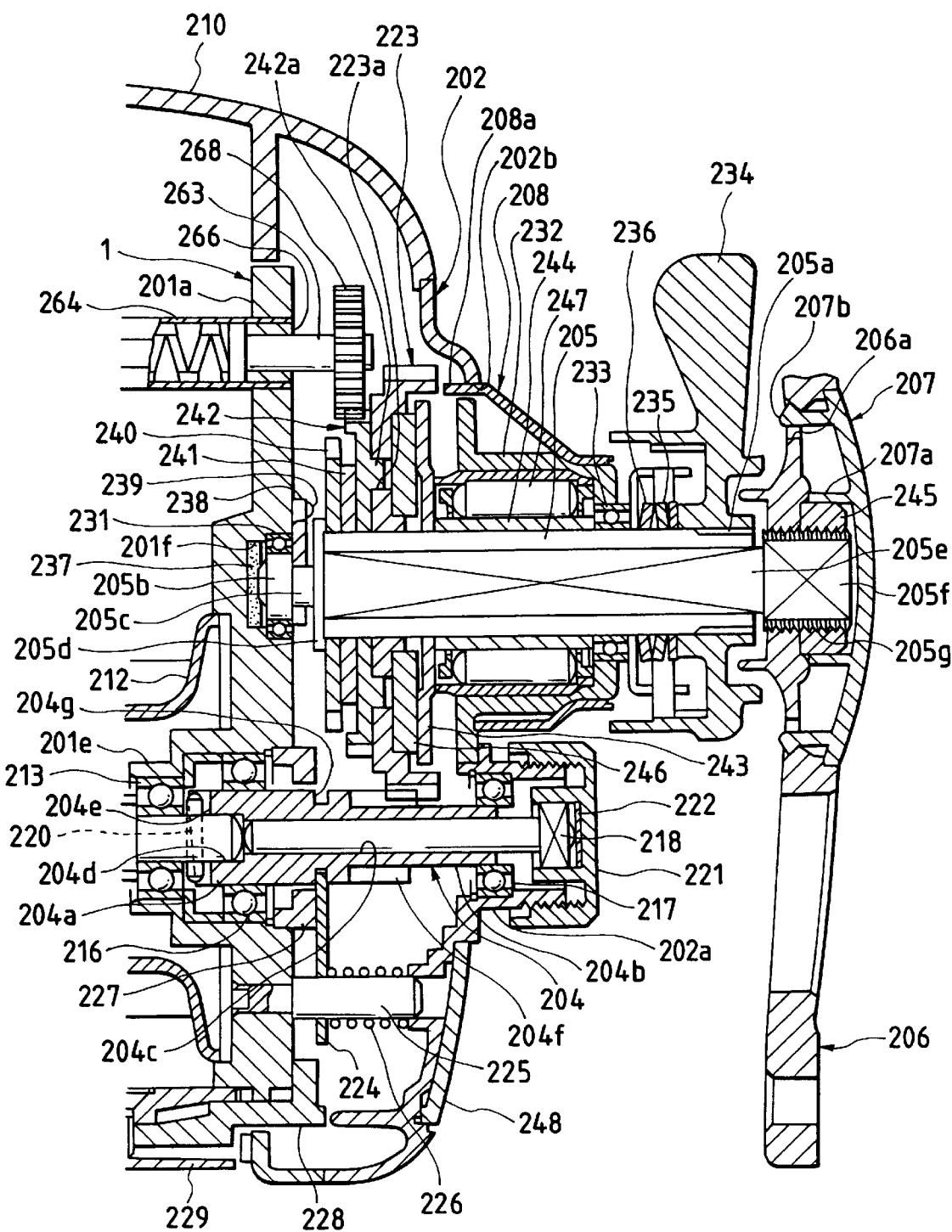
FIG. 25 is an enlarged cross-sectional plan view of the double bearing type reel for fishing on the handle side of the sixth example.

As shown in FIGS. 24 and 26, on the left reel side plate 202', there are provided an outer circumferential section 202c, engaging section 202d, and cylindrical sections 202e, 202f which are arranged inside.

As illustrated in FIGS. 24 and 26, the bearing support member 203 includes: a large diameter section 203a, and a bearing support cylinder 203c arranged inside which is formed into a C-shape in the large diameter 203a and the intermediate diameter section 203b.

Outside the intermediate diameter section 203b, there is provided an opening 203d which is formed by a cutout.

Inside the large diameter section 203a, there is provided an annular bank-shaped portion 203e. Inside the annular bank-shaped portion 203e, there is provided an engaging groove 203f.

On the rear side of the outer circumference of the large diameter section 203a, there are provided a plurality of engaging protrusions 203g.

On the bottom surface of the bearing support cylinder 203c, there is provided a conic through-hole 203h. At the opening edge of the bearing support cylinder 203c, there is provided an engaging groove 203i.

A ring 252 made of magnetic material is fixed onto the outer circumference of the bearing support cylinder 203c.

A cylindrical body 254 into which a plurality of magnets 253 are inserted is engaged with and fixed to the outer circumference of the ring 252.

The ring 252 made of magnetic material and the magnets 253 may be inserted into the bearing support member 203.

In the bearing support cylinder 203c, there are provided a screw 249, spacer 255, thrust bearing 219, spacer 256 and bearing 214, which are prevented from coming off from the bearing support cylinder 203c by an engaging ring 257.

The magnetic brake member 250 is inserted into the intermediate diameter section 203b and prevented from coming off by an engaging ring 258 engaged in the engaging groove 203f.

The cover 209 is formed into a curved shape. Inside the cover 209, there is provided a protruding section 209a. In the protruding section 209a, there is provided a screw hole 209b. In the periphery of the cover 209, there is provided an annular engaging section 209c.

The magnetic brake member 250 includes: a cylindrical section 250a, tooth section 250b protruding from the outer circumference of the cylindrical section 250a, and inner circumferential section 250c in the cylindrical section 250a. In this structure, the ring 259 made of magnetic material and the plurality of magnets 260 are subjected to insert formation.

There is provided a brake adjustment knob 251, which includes an operating section 251a arranged on the outer circumference, shaft cylinder section 251b, tooth section 251c arranged on the outer circumference of the shaft cylinder section 251b, and central through-hole 251d.

A screw 261 having a head portion is inserted into the central through-hole 251d and prevented from coming off by an E ring 262.

Between both inside plates 201a and 201b in the front section of the frame 201, there is provided a level winding device D.

Level winding device D includes: a traverse shaft 263, guide cylinder 264, and fishing line guide body 265 sliding on the outer circumference of the guide cylinder 264 in the transverse direction.

The traverse shaft 263 is supported by the right 266 and the left bearing 267 arranged in the guide cylinder 264.

A gear 268 is attached to one end of the traverse shaft 263. This gear 268 is meshed with a drive gear 242.

When the attaching unit C is assembled, the bearing support member 203 is set inside the left reel side plate 202', and the cover 209 is set outside, and then both members are fastened to each other by a screw 249 which is screwed into a screw hole 209b.

Next, the magnetic brake member 250 is inserted into the bearing support member 203 and prevented from coming off by an engaging ring 258.

Into the bearing support cylinder 203c, there are inserted a screw 249, spacer 255, thrust bearing 219, spacer 256 and bearing 214, which are prevented from coming off by an engaging ring 257.

The brake adjustment knob 251 is inserted into the cylindrical section 202f, and the tooth section 250b is meshed with the tooth section 251c.

When the attaching unit C is attached to the frame 201, the bearing support member 203 is inserted into the through-hole 201h of large diameter on the left inside plate 201b and rotated. Therefore, the plurality of engaging protrusions 203g are engaged with the plurality of engaging recesses 201i, and the screw 261 inserted into the central through-hole 251d of the brake adjustment knob 251 is screwed into the screw hole 201j.

When the attaching unit C is attached to the frame 201, the spool shaft 211 is inserted into the bearing 214, and the magnetic brake cylinder 215 is arranged between the magnets 253 and 260.

In the above arrangement, the bearing support member 203 is provided with a plurality of engaging protrusions 203g, which are engaged with the plurality of engaging recesses 201i. However, it is possible to provide a plurality of engaging protrusions on the left reel side plate 202', and the plurality of engaging protrusions may be engaged with the plurality of engaging recesses 201i.

The deformable absorbing member 237 is inserted into the recess 201f on the right inside plate 201a together with the bearing 231. The base portion 205b of the handle shaft 205 is engaged with the bearing 231, and the locking plate 238 is engaged with the small diameter portion 205c, so that the handle shaft 205 is prevented from coming off. At this time, the end surface of the base portion 205b comes into contact with the absorbing member 237, and the absorbing member is deformed by the contact with the base portion 25b.

After the absorbing member 237 has been deformed, play of the base portion 205b formed in the recess 201f in the axial direction is absorbed by the absorbing member 237. Therefore, no play is caused with respect to the handle shaft 205.

The bearing 231 is arranged between the outer circumference of the base portion 205b of the handle shaft 205 with which the drive gear 223 is engaged and combined frictionally, and the recess 201f of the right inside plate 201a. Also, the deformable absorbing member 237 is arranged between the end surface of the base portion 205b and the recess 201f of the right inside plate 201a, so that play of the handle shaft in the axial direction can be absorbed. Therefore, the movement of the handle shaft 205 in the axial direction can be stably restricted to maintain a high rotational performance, and the durability can be enhanced.

When the double bearing type reel for fishing is composed as described above, by the deformation of the deformable absorbing member 237, the movement of the handle shaft 205 in the axial direction can be stably restricted. Accordingly, it is possible to maintain the high rotational performance and enhance the durability.

Figure 28:
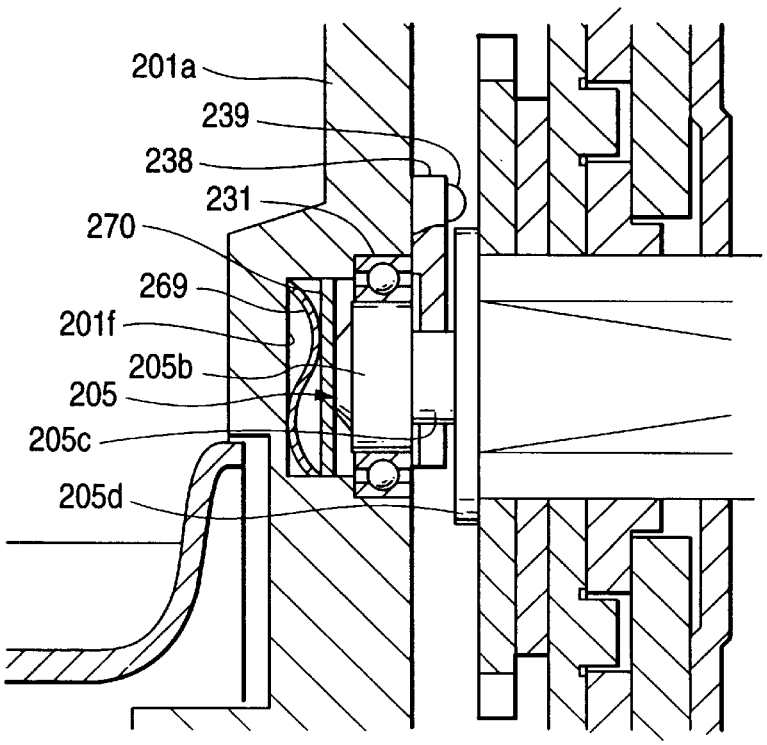
FIG. 28 is an enlarged cross-sectional plan view of the primary portion of the double bearing type reel for fishing of the seventh example.

FIG. 28 is a view showing the seventh example.

In the seventh example, in the recess 201f on the right inside plate 201a, there is provided a deformable absorbing member 269 made up of a spring, and also there are provided a thrust bearing 270 and a bearing 231.

Other points of the seventh example are the same as those of the sixth example.

In the arrangement described above, the rolling type one way clutch B is incorporated onto the outer circumference of the drive shaft 205, however, this rolling type one way clutch B may be omitted.

In the arrangement described above, the right inside plate 201a, the left inside plate 201b, the reel 201c and the stationary plate 201d are integrally formed, however, they may be separately formed, and both inside plates 201a, 201b may be held in parallel with each other.

According to the sixth and seventh examples of the present invention, the following effects can be provided.

By the deformation of the deformable absorbing member, it is possible to stably restrict the movement of the handle shaft in the axial direction. Also, it is possible to maintain the high rotational performance and enhance the durability.

Referring to the eighth example shown in FIGS. 29 to 31, the present invention will be explained below.

Figure 29:
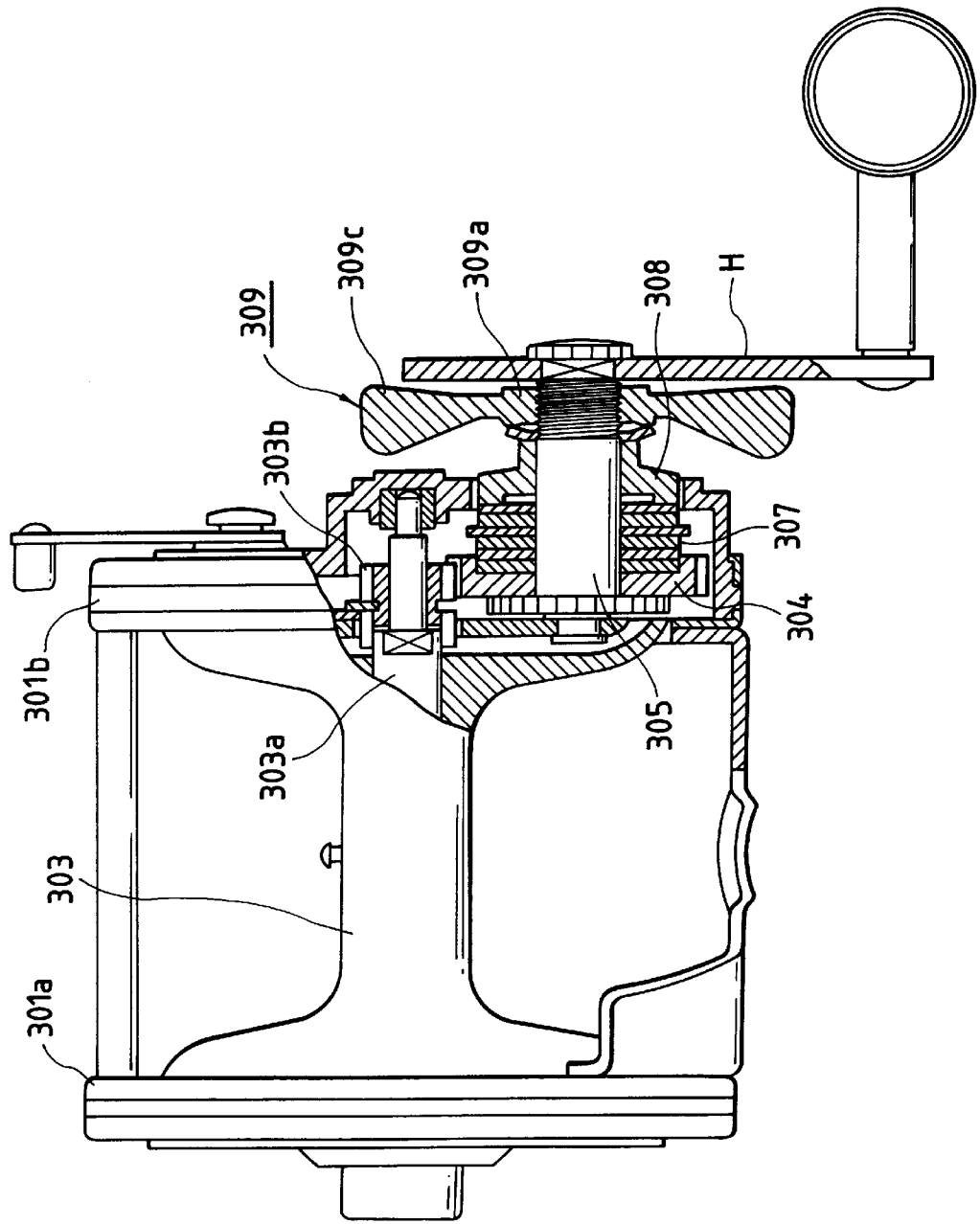
FIG. 29 is a partially cross-sectional plan view of the double bearing type reel for fishing of the eighth to which the featured braking adjustment device is applied.
Figure 30:
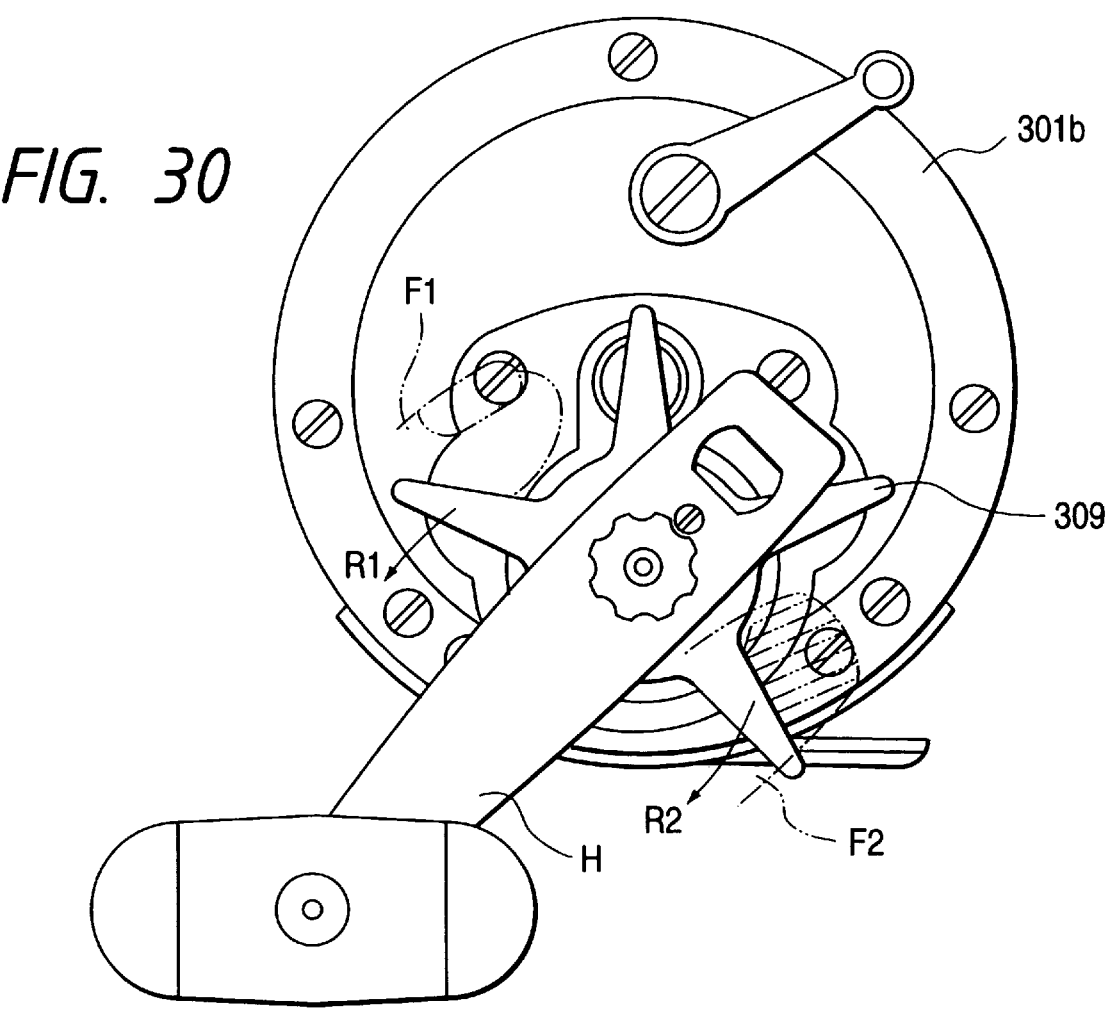
FIG. 30 is a side view of the double bearing type reel for fishing to which the featured braking adjustment device is applied.
Figure 31:
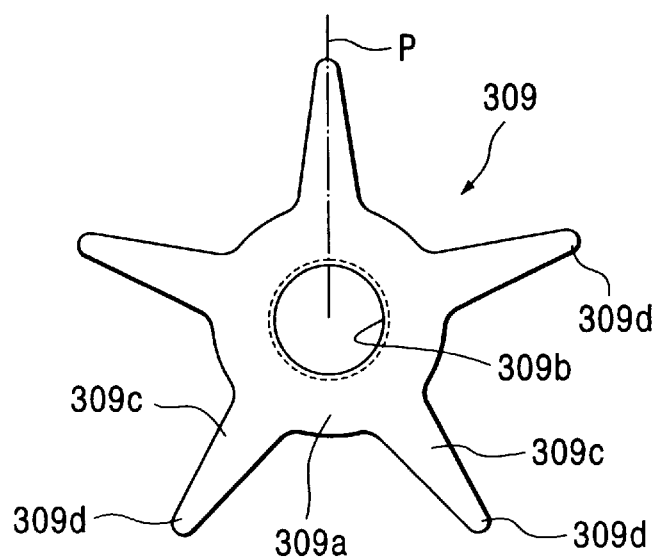
FIG. 31 is a schematic illustration showing an example of the operation adjustment knob used for the braking adjustment device of the reel for fishing.

FIGS. 29 to 31 are views showing a double bearing type reel for fishing to which a braking force adjustment device of an embodiment of the present invention is applied. Between the side plates 301a and 301b of the reel body, there is provided a spool 303 which is rotatably supported.

There is provided a pinion 303b attached to the spool shaft 303a of the spool 303. This pinion 303b is meshed with a drive gear 304, which is rotated integrally with a handle shaft 305 to which a handle H is attached. Outside the drive gear 304, there are provided a plurality of braking plates 307 into which the handle shaft 305 is inserted. Outside the braking plates 307, there is provided a pushing member 308.

On the front side of the handle shaft 305 and inside the handle attaching portion at which the handle H is attached, there is provided an operation adjustment knob 309 of the braking force adjustment device by which the pushing member 308 can be pushed. This operation adjustment knob 309 is star-shaped. At the center of the central boss section 309a, there is provided a screw hole 309b screwed to a male screw section formed on the outer circumference of the handle shaft 305. In the boss section 309a, there are provided a plurality of arms 309c arranged in the radial direction at predetermined angular intervals, wherein each arm is formed symmetrically with respect to the center line P of the arm extending in the radial direction. As shown in FIGS. 30 and 31, each arm 309c is formed into a tapering shape, that is, a shape of each arm 309c on a surface parallel with the side plate is contracted when it comes from the boss section 309a to the end of the arm.

The thickness of the operation adjustment knob 309, that is the dimension of the operation adjustment knob 309 in the axial direction of the handle shaft is determined in such a manner that a portion at which a finger is caught in the case of a fishing operation is thick as shown in FIG. 29. In this connection, in FIG. 30, reference numeral F1 is a thumb, and reference numeral F2 is a forefinger. Reference numeral R1 is a rotational direction of the operation adjustment knob 309 in which a braking force can be reduced by the operation of thumb F1. On the contrary, reference numeral R2 is a rotational direction of the operation adjustment knob 309 in which a braking force can be increased by the operation of forefinger F2.

In this connection, in the example shown in FIG. 29, the thickness of the arm 309c is gradually increased when it comes from the base to the end of the arm. However, it should be noted that the present invention is not limited to the specific example, but the thickness of the arm 309c may be uniform from the base to the end of the arm 309c. The operation adjustment knob 309 shown in the accompanying drawings has five arms 309c. However, it should be noted that the present invention is not limited to the specific embodiment, but the number of the arms 309c may be changed. Of course, the braking device including the braking plate 308 and pushing plate 309 is not limited to the specific embodiment shown in the drawings.

As described above, according to the eighth example of the present invention, a shape of the arm of the operation adjustment knob of the braking force adjustment device on a surface parallel with the side plate is tapered when it comes from the base to the end. Therefore, even when the reel is operated while the handle is held, there is no possibility that a finger is caught by the arm, and it is possible to conduct a rotational operation smoothly. Accordingly, a braking force can be quickly adjusted in accordance with the circumstances of fishing. In the operation adjustment knob of the present invention, the end of the arm is formed thick. Accordingly, there is no possibility that the operation adjustment knob bites into a finger of a fisherman and causes a pain in the finger. Therefore, the fisherman can enjoy fishing comfortably by the reel for fishing of the present invention.

What is claimed is:

1. A double bearing type reel for fishing in which a fishing line is wound round a spool rotatably supported between side plates of a reel body, said double bearing type reel comprising:

a first attaching member having a bearing for rotatably supporting said spool; and a second attaching member secured to said first attaching member by a screw arranged coaxially to said bearing and located opposite from said spool with respect to said bearing, wherein said first and second attaching members clamp one of said side plates therebetween.

2. A double bearing type reel according to claim 1, wherein said first and second attaching members and preferred side plate form a unit detachably mounted to said reel body.

3. A double bearing type reel according to claim 1, wherein one of said first and second attaching members includes an integral portion forming one of said side plates.

* * * * *